United States Patent [19]
Loiz et al.

[11] Patent Number: 5,708,436
[45] Date of Patent: Jan. 13, 1998

[54] MULTI-MODE RADAR SYSTEM HAVING REAL-TIME ULTRA HIGH RESOLUTION SYNTHETIC APERTURE RADAR (SAR) CAPABILITY

[75] Inventors: Miguel E. Loiz, Shelton; Kevin J. Kelly, Stamford; John P. Robinson, Newtown, all of Conn.; Edward F. Stockburger, North Caldwell, N.J.; Russell Whitman, Ansonia, Conn.

[73] Assignee: Northrop Grumman Corporation, Los Angeles, Calif.

[21] Appl. No.: 668,897

[22] Filed: Jun. 24, 1996

[51] Int. Cl.$^6$ ............................................. G01S 13/90
[52] U.S. Cl. ........................ 342/25; 342/161; 342/162
[58] Field of Search ........................ 342/25, 161, 162, 342/191, 192, 194, 195, 197, 185

[56] References Cited

U.S. PATENT DOCUMENTS

| | | | |
|---|---|---|---|
| 4,724,418 | 2/1988 | Weindling | 342/25 |
| 4,910,520 | 3/1990 | Rosen et al. | 342/25 |
| 5,043,734 | 8/1991 | Niho | 342/25 |
| 5,329,283 | 7/1994 | Smith | 342/25 |
| 5,570,691 | 11/1996 | Wright et al. | 128/661.01 |
| 5,581,517 | 12/1996 | Gee et al. | 367/138 |
| 5,608,404 | 3/1997 | Burns et al. | 342/25 |

OTHER PUBLICATIONS

*IEEE Spectrum*—"An Introduction To Synthetic Aperture Radar", W.M. Brown and L.J. Porcello, (Sep., 1969) pp. 52–62.

*SPIE*—"Autofocus of SAR Imagery Degraded By Ionospheric–Induced Phase Error", Jakowitz, Eichel and Ghiglia, vol. 1101, Millimeter Wave and Synthetic Aperture Radar (1989).

*IEEE Transactions on Aerospace and Electronic Systems*, "Phase Gradient Autofocus—A Robust Tool For High Resolution SAR Phase Correction" Wahl, Eichel, Ghiglia and Jakowatz, vol. 30., No. 3, Jul., 1994.

*Primary Examiner*—John B. Sotomayor
*Attorney, Agent, or Firm*—Walter G. Sutcliff

[57] ABSTRACT

One meter and one foot resolution is achieved in a multimode SAR radar system in real time by wide bandwidth RF signal generation, precision motion compensation, polar reformatting, autofocusing and high dynamic range image processing. An exciter/receiver of this system includes means for providing wideband RF waveform generation and down-conversion, while a programmable digital signal processor includes improvements in software for implementing the functions of motion compensation including the presuming of data, polar reformatting, autofocusing and image processing.

31 Claims, 11 Drawing Sheets

FIG. 1
PRIOR ART
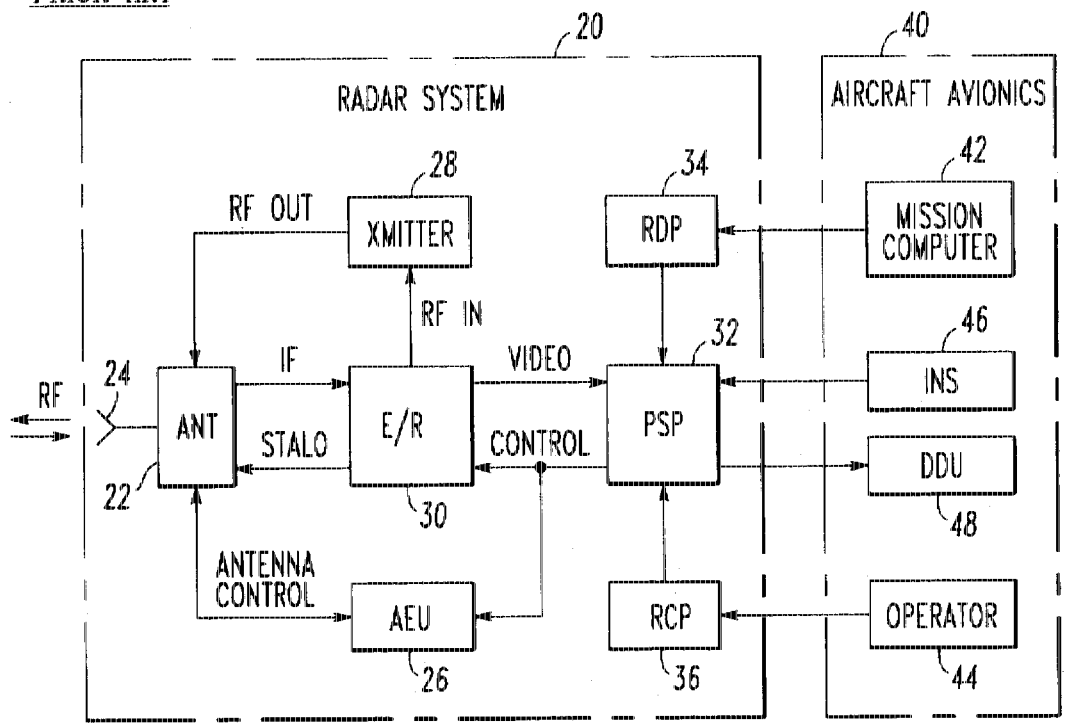
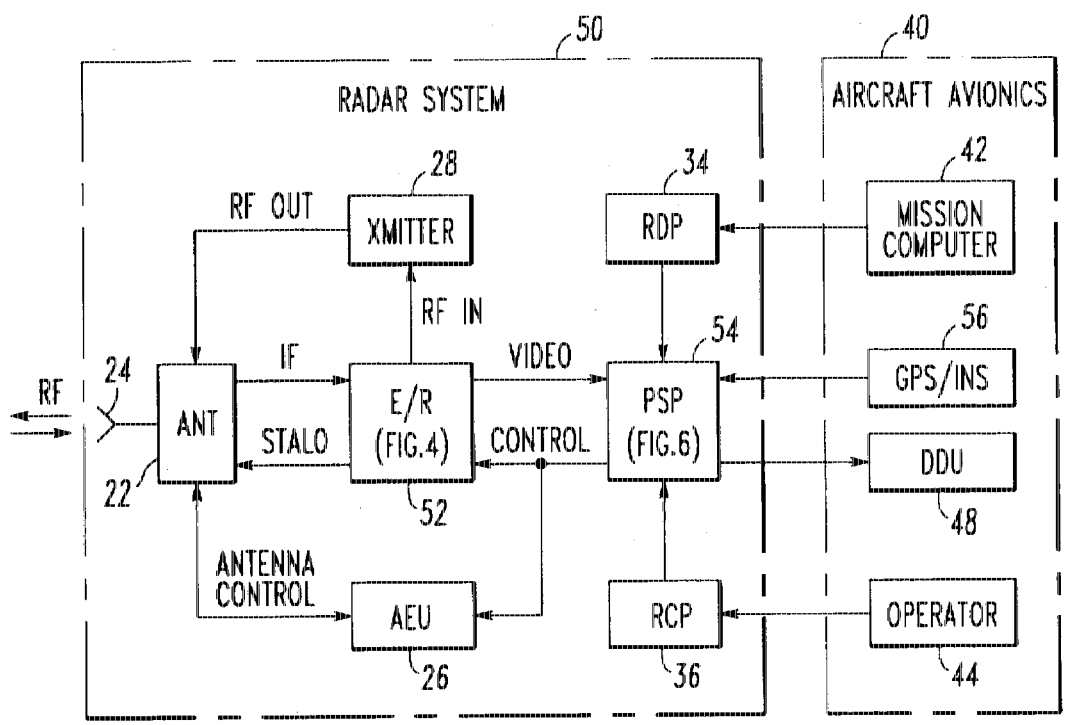
FIG. 2

FIG. 9
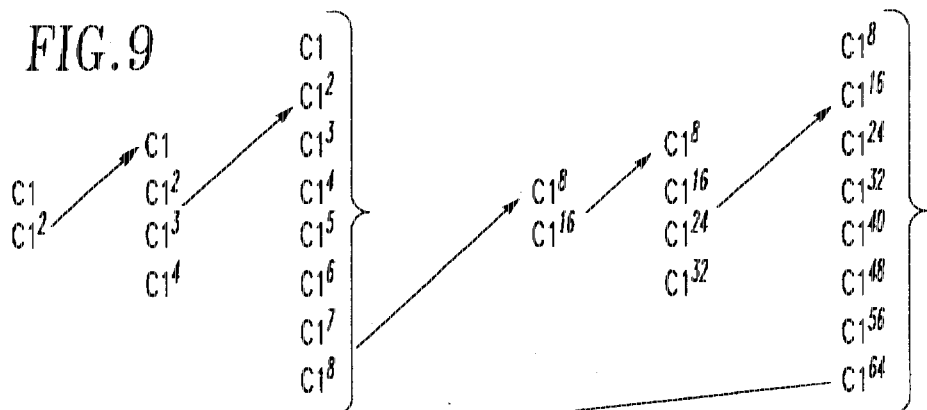
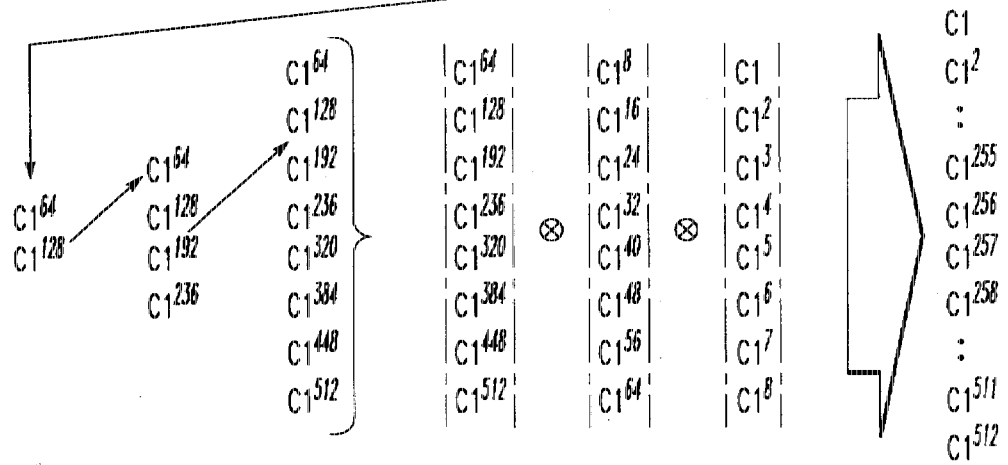
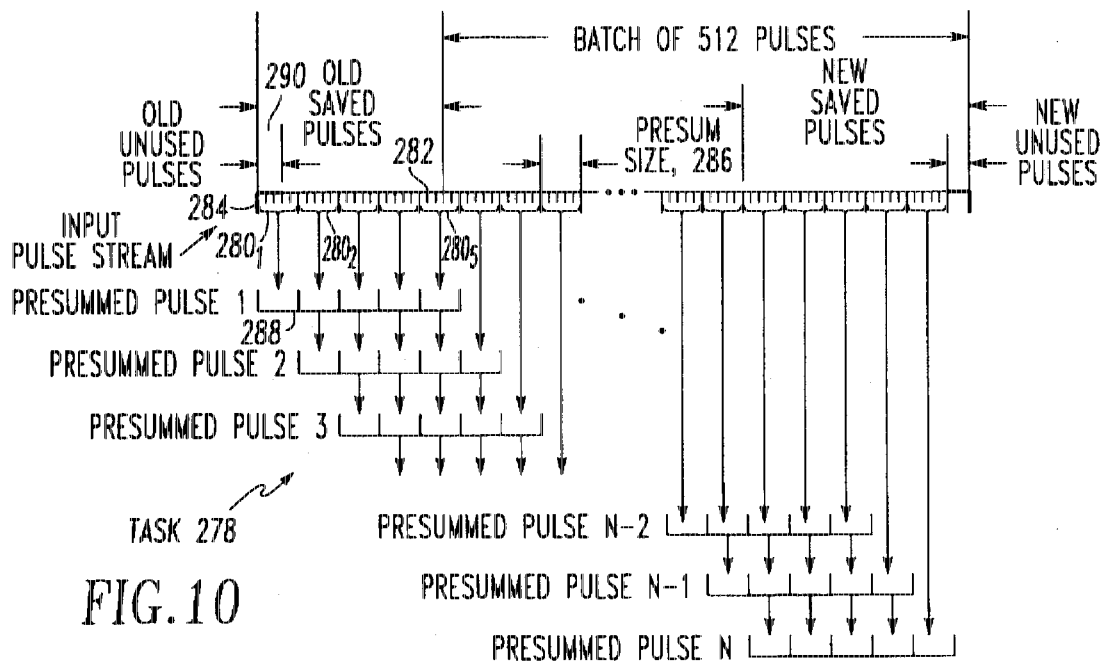
FIG. 10

FIG.13
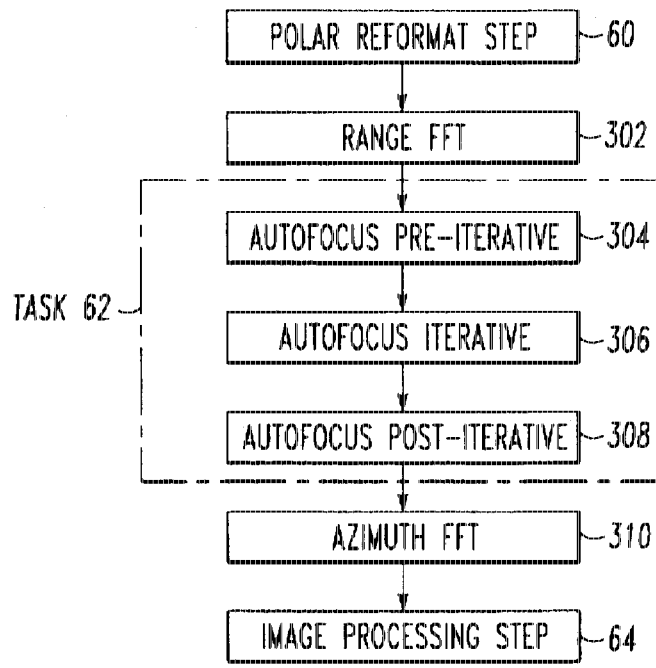
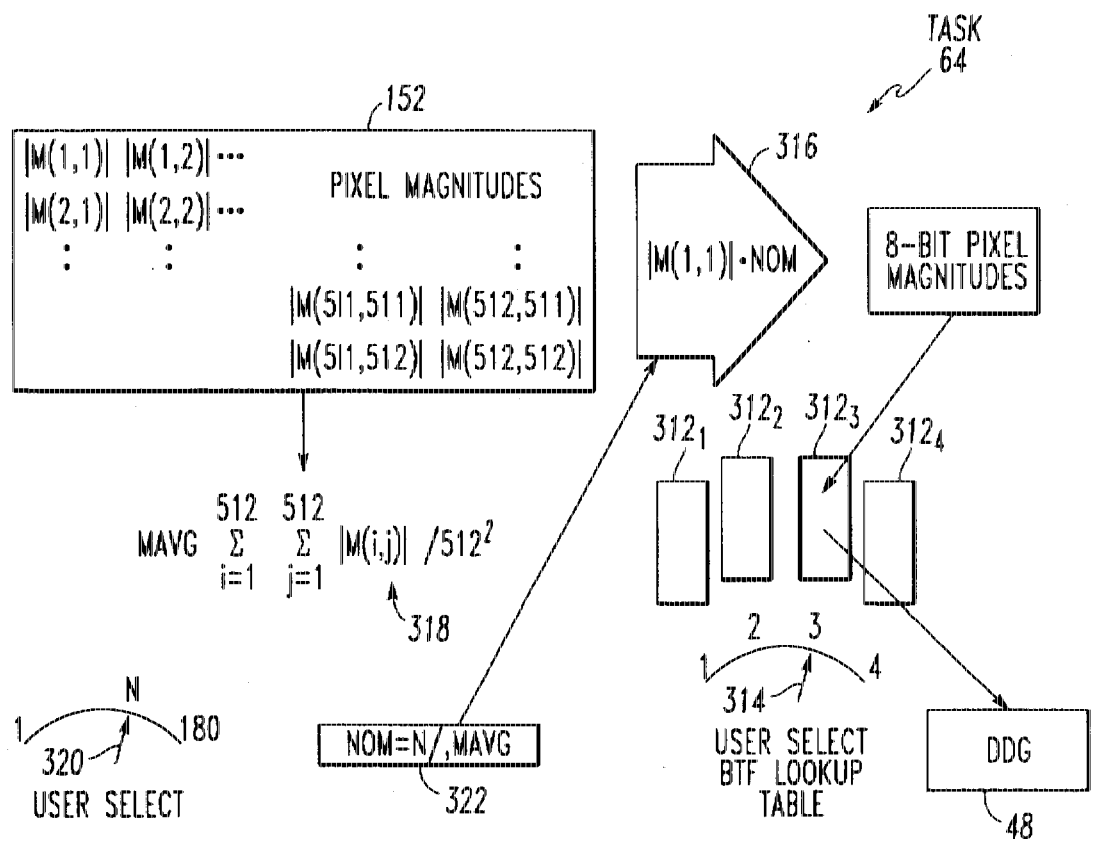
FIG.16

MULTI-MODE RADAR SYSTEM HAVING REAL-TIME ULTRA HIGH RESOLUTION SYNTHETIC APERTURE RADAR (SAR) CAPABILITY

CROSS-REFERENCE TO RELATED APPLICATION

This application is related to an application Ser. No. 08/331,076, (Northrop Grumman Case #N1234), entitled, "Interferometric Moving Vehicle Imaging Apparatus And Method", filed in the name of Edward F. Stockburger et al, on Oct. 28, 1994. This application is assigned to the assignee of the present invention and is intended to be incorporated herein by reference.

BACKGROUND OF THE INVENTION

1. Field of the Invention

This invention relates to multi-mode radar systems and more particularly to an airborne radar system including signal processing means for providing enhanced resolution of synthetic aperture radar (SAR) imagery in real-time.

2. Description of Related Art

Multi-mode airborne radar systems having a synthetic aperture radar (SAR) mode are well known. Such apparatus is typically located on board a tactical aircraft and provides SAR imagery of the radar return signals in both the range dimension and the cross-range or azimuth dimension. Range resolution is achieved in a well known manner by using either a high bandwidth fixed frequency transmit pulse or a frequency modulated (FM) transmit pulse. Resolution in the cross-range dimension is achieved by synthesizing a large antenna aperture using the motion of the radar platform. The key to SAR is the data processing of reflected return data. For an overview of SAR, one can refer to the publication entitled "An Introduction To Synthetic Aperture Radar" by W. M. Brown and L. J. Porcello, *IEEE Spectrum* (September, 1969), pages 52–62.

High resolution synthetic aperture radar is a field of particular interest to military tactical and surveillance systems due to the need to accurately identify hostile ground vehicles prior to targeting, combined with the requirement to minimize the exposure of friendly platforms. Such a system is disclosed in Ser. No. 08/331,076 cross-referenced above.

Although systems have been developed which are capable of providing resolution enhancement, the complexity of the signal processor increases accordingly. A further complication arises when tactical synthetic aperture radar systems need to operate in a forward looking squint mode. Squint mode operation requires even more sophisticated signal processing to perform the task.

As a result, a SAR system is often more constrained by the capabilities of its signal processor rather than the capabilities of the RF portion of the system. Ideally, the signal processor should be able to produce high quality imagery regardless of the scene being viewed. This requirement often stresses or exceeds the capabilities of any real-time SAR system. As a result, the system designer must make trade-offs with respect to processor complexity and image quality. This is particularly true for squint mode systems where image quality is more susceptible to problems because of the imaging geometry.

SAR image quality is often directly impacted by the depression angle of the sensor. Sensors operating at long range also operate at very low depression angles. At these low depression angles, shadows become longer and clutter backscatter decrease; however, radar backscatter from man-made objects are relatively unaffected. As a result, the radar image contains very few strong radar scatterers, with the remainder of the scene being comprised of very low reflectivity or none at all for the shadow regions. It is during this geometry when the signal processor is stressed the most. High dynamic range therefore is required with very low sidelobes in order to faithfully duplicate the scene being imaged.

SUMMARY

Accordingly, it is an object of the present invention to provide an improvement in radar systems having a synthetic aperture radar (SAR) capability.

It is another object of the invention to provide a radar system having a real-time ultra high resolution synthetic aperture radar capability.

It is a further object of the invention to provide a radar system having the ability to provide one meter and one foot resolution synthetic aperture radar imagery in real time.

The foregoing and other objects of the invention are achieved by a multi-mode airborne SAR radar system whose resolution of imagery in real-time is improved by wide bandwidth RF signal generation, precision motion compensation, polar reformatting, autofocusing and high dynamic range image processing and where wide bandwidth RF signal generation is implemented in hardware and the remaining functions are implemented in software.

An exciter/receiver of this system includes means for providing wideband RF waveform generation and down conversion, while a programmable digital signal processor includes software for implementing algorithms that control the generation of wideband RF waveforms which are radiated from a multi-aperture antenna and thereafter process the radar return signals. Global positioning system data along with inertial navigation system data is also utilized for the determination of velocity and position of the radar platform.

The target return signal processing steps required to generate the required high resolution synthetic aperture radar maps in accordance with this invention are first corrected to produce an unfocused motion-compensated synthetic aperture data matrix. The elements of this matrix are complex data comprised of in-phase (I) and quadrature (Q) components for which one matrix dimension is frequency which corresponds to range, and the other dimension is pulse index, which corresponds to cross-range. This matrix is next remapped via polar reformatting from a polar coordinate format inherent in the radar data collection system to a rectangular coordinate format required for display. This matrix is then autofocused and Fourier transformed into a focused image. The focused image then undergoes image processing to provide a relatively high dynamic range visual image.

Further scope of applicability of the present invention will become apparent from the detailed description provided hereinafter. However, it should be noted that the detailed description and specific examples provided, while depicting preferred embodiments of the invention, are given by way of illustration only. Accordingly, various changes and modifications within the spirit and scope of the invention will become apparent to those skilled in the art from this detailed description.

BRIEF DESCRIPTION OF THE DRAWINGS

The present invention will become more fully understood from the detailed description provided hereinafter and the accompanying drawings which are provided by way of illustration only, and thus are not limitative of the present invention, and wherein:

FIG. 1 is a block diagram broadly illustrative of a synthetic aperture radar system according to the known prior art;

FIG. 2 is a block diagram illustrative of a synthetic aperture radar in accordance with the subject invention;

FIG. 9 is a diagram illustrative of the steps used in computing a range slip correction coefficient C1" carried out by the subject invention;

FIG. 10 is a diagram illustrative of a data presumming carried out by the subject invention;

FIG. 13 is a diagram illustrative of three signal processing steps utilized in an autofocus procedure carried out by the subject invention;

FIG. 16 is a diagram illustrating the high dynamic range image display process carried out by the subject invention following the autofocusing procedure of FIG. 15.

DETAILED DESCRIPTION OF THE INVENTION

Figure 3:
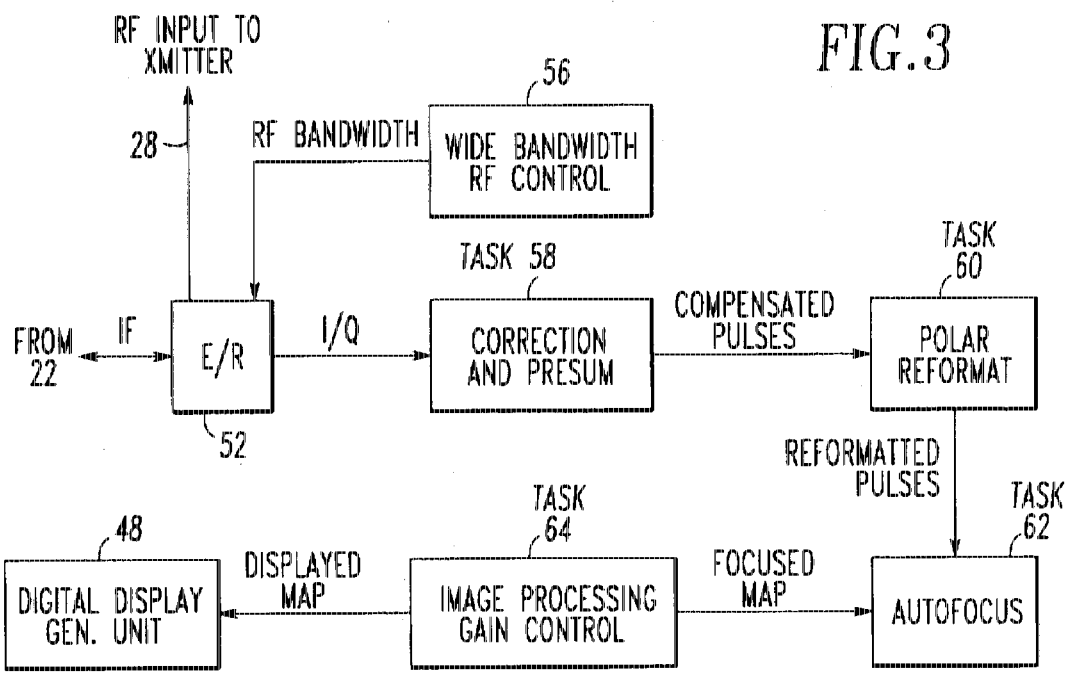
FIG. 3 is an electrical block diagram broadly illustrative of the preferred embodiment of the subject invention.

Referring now to the drawing wherein like reference numerals refer to like elements, shown in FIG. 1 is a block diagram of a known prior art multi-mode airborne radar system 20, such as an AN/APG-76 radar, having a synthetic aperture radar (SAR) capability. As shown, the system 20 is comprised of seven major units which can be implemented as line replaceable units, including: an antenna (ANT) unit 22 having a multi-aperture antenna array 24; an antenna electronics (AEU) unit 26; a transmitter (XMITTER) unit 28; an exciter/receiver (E/R) unit 30; a programmable signal processor (PSP) unit 32; a radar data processor (RDP) unit 34; and a radar control panel (RCP) unit 36.

The radar system 20 communicates with aircraft avionics equipment 40 including a mission computer which communicates with the RDP unit 34. An operator designated by reference numeral 44 communicates with the system 20 via the RCP unit 36. The radar system 20, moreover, obtains aircraft position and velocity information from an inertial navigation system (INS) unit 46 via the PSP unit 32. A digital display unit (DDU) 48 receives processed data from the PCP unit 32. The radar system 20 can be designed for installation in the nose of an aircraft or a pod, not shown, while the avionics equipment 40 is located in the aircraft's cockpit also not shown.

The antenna array 24 of an AN/APG-76 radar system comprises a vertically polarized flat plate array consisting of multi-apertures, each possessing its own microwave down-converter assembly located in the ANT unit 22. A monopulse aperture, not shown, is located in the upper center of the array 24 and is used for transmission in all modes. A Sum receive channel of the monopulse aperture is used for all mapping functions. Delta receive channels provide data for tracking. Three additional apertures, not shown, are located beneath the monopulse aperture and are arranged as a three port azimuth interferometer and provide both precision velocity update to correct for inertial navigation system velocity error in a synthetic aperture radar (SAR) mapping mode and clutter suppression interferometer process used for moving target detection and relocation. The interferometer portion forms the subject matter of the cross referenced related application Ser. No. 08/331,076 which, as noted above, is incorporated herein by reference.

The ANT unit 22, moreover, includes a total of seven low noise amplifier/double conversion mixers for converting KU-band receive signals to seven IF signals for transmission to the E/R unit 30. The seven IF signals are monopulse Sum, Delta Azimuth, Delta Elevation, Left, Center, and Right Interferometers and Guard IFs.

The AEU unit 26 contains power supplies for the receiver portions of the ANT unit 22, servodrive electronics and IMU and encoder control circuitry located therein. The XMITTER unit 28 provides high powered pulsed RF to the ANT unit 22 for transmission by the antenna array 24. It, moreover, provides 11 KW peak power at a maximum duty cycle of 5% for an average power of 550 W.

The E/R unit 30 provides a low power pulsed RF input to the XMITTER unit 28 for amplification and transmission as well as coherent stable local oscillator (STALO) reference signals required by the down converters in the ANT unit 22. A set of eight transmit frequencies are available. The receiver portion of the E/R unit 30 is coupled to the seven IF outputs of the ANT unit 22. Depending on the current operational mode, up to four of the seven IF signals are routed to four parallel receiver channels. These channels provide amplification, attenuation for gain control, and sensitivity time control (STC), bandwidth filtering, pulse compression, coherent detection and analog to digital conversion of the selected IF signals.

The PSP unit 32 includes two primary elements, a scaler processor and a vector processor. The scaler processor comprises a conventional floating point MIL-STD-1750A processor which performs a substantial amount of the radar control processing. The vector processor performs the radar signal processing functions and includes five parallel complex block floating point arithmetic pipeline processors (CAVP), each capable of executing 100 million operations per second (100 MOPS). The CAVPs are interconnected by ring bus architecture and controlled by a separate control processor. The vector processor accepts blocks of digitized complex video from the E/R unit 30 and is operable to perform 16-bit complex arithmetic operations, such as Fast Fourier Transforms required to implement the radar's operational modes.

The RDP unit 34 also comprises a MIL-STD-1750A processor which is used as the interface between the radar system 20 and the aircraft's avionics equipment 40. The RCP unit 36 provides on/off and major mode control functions of the radar system and are implemented by a set of operator controlled switches, not shown.

Figure 4:
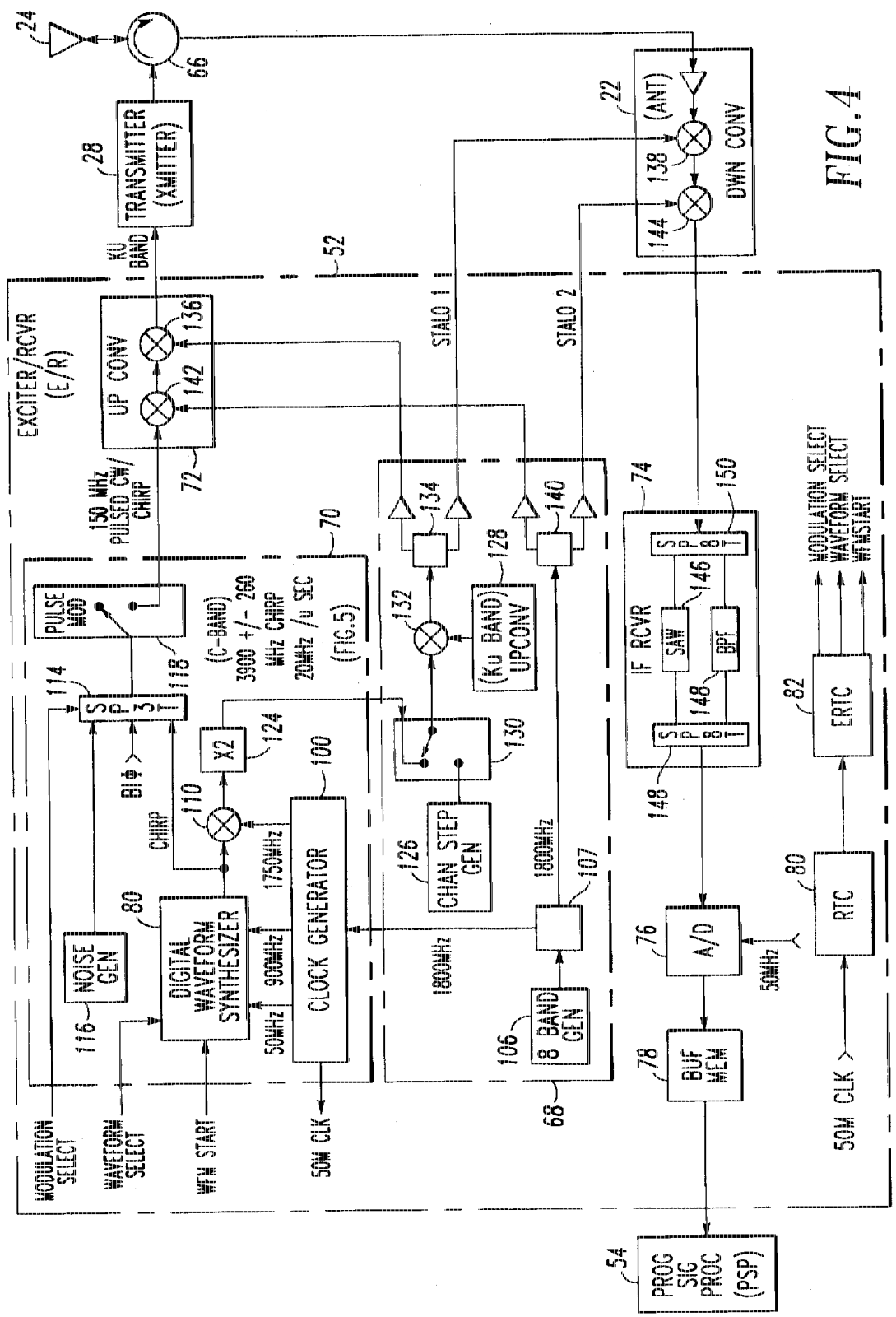
FIG. 4 is an electrical block diagram illustrative of the exciter/receiver portion of the radar system shown in FIG. 2.
Figure 6:
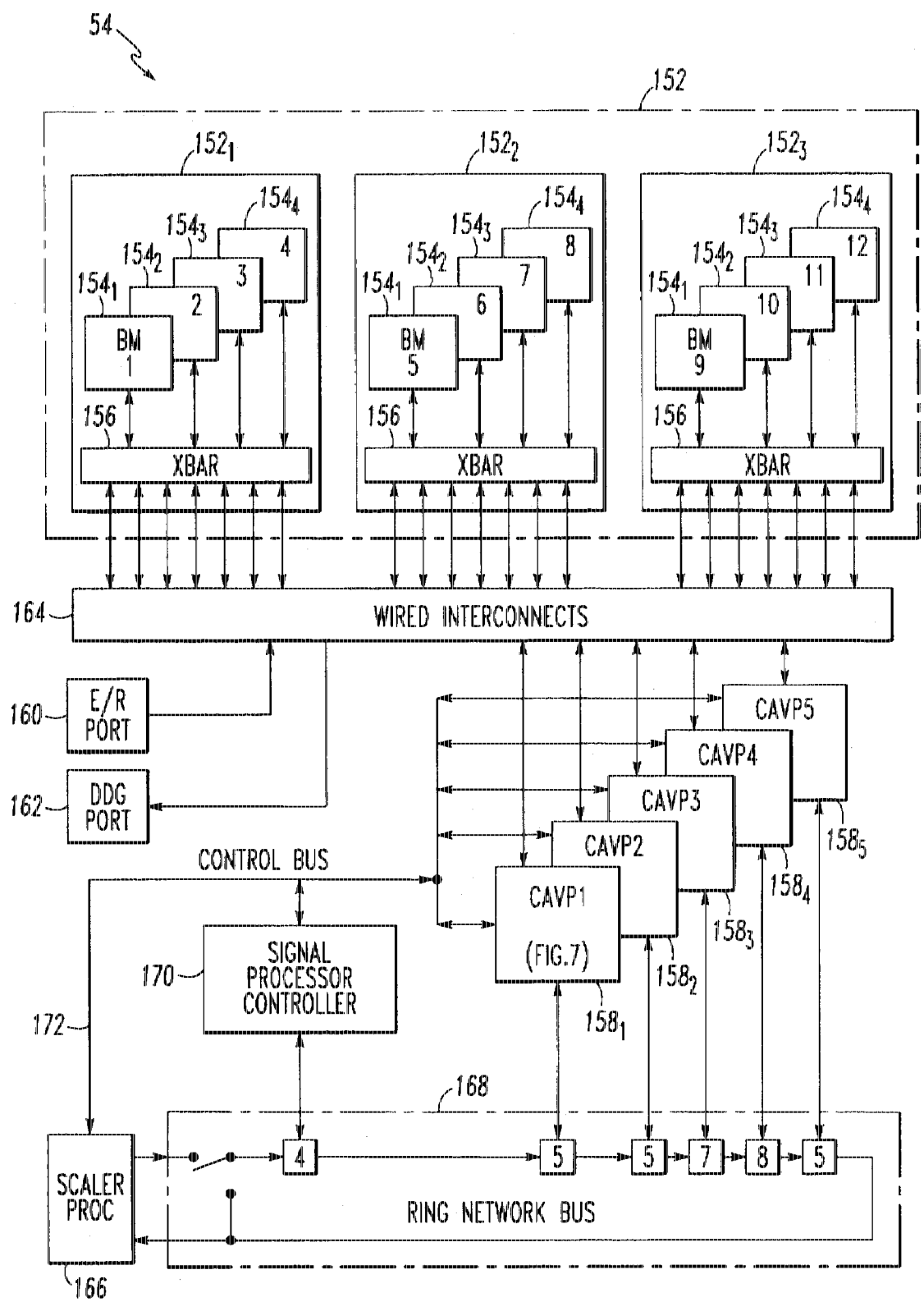
FIG. 6 is an electrical block diagram illustrative of the programmable signal processor (PSP) portion of the radar system shown in FIG. 2.

The subject invention is shown in FIG. 2 and comprises a radar system 50 which is particularly directed to, but not limited to an AN/APG-76 radar system having an improved image resolution in real time and which includes all the components shown in the system of FIG. 1, with the exception that the exciter/receiver (E/R) unit 30 is replaced by the E/R unit 52, the details of which are shown in FIG. 4, and the PSP unit 54, the details of which are shown in FIG. 6. Also, the aircraft avionics equipment 40 includes a GPS/INS unit 56 which incorporates global positioning system (GPS) data along with that provided by an inertial navigations system (INS) for the determination of velocity and position of the radar platform i.e. the aircraft.

FIG. 3 broadly depicts the processing steps required to generate high resolution (one meter and one foot) synthetic aperture radar SAR maps in accordance with the subject invention. First, the E/R unit 52 must be controlled as shown by block 56 to generate wideband RF waveforms which are radiated from the antenna array 24 and received back through the antenna unit 22 as shown in FIG. 2. The radar RF returns are first converted to IF signals and digitized in the E/R unit 52 and which are then motion compensated as shown by corrections block 58 to produce compensated pulses which then presummed to form an unfocused synthetic aperture data matrix. The elements of this matrix are complex numbers including in-phase (I) and quadrature (Q) components for which one matrix dimension is frequency and corresponds to range while the other dimension is pulse index and corresponds to cross-range or azimuth. This matrix is next remapped in a polar reformatting step 60 from the polar coordinate format inherent in the radar data collection system to a rectangular coordinate format required for display in the DDG unit 48. This matrix is then autofocused and Fourier transformed into a focused image or map as shown by function block 62. This focused image then undergoes further image processing step 64 as shown to provide a visual display on the DDG unit 48.

The details for implementing the generation of the necessary RF waveforms and the subsequent processing of the radar return signals will now be considered.

Hardware Implementation

Referring now to FIG. 4, depicted in block diagrammatic form is the exciter/receiver (E/R) unit 52 which is further shown coupled on the transmit side to the XMITTER unit 28 and on the return side to the ANT unit 22. The XMITTER unit 28 and the ANT unit 22 are coupled to the antenna array 24 by means of a well known circulator unit 66. The E/R unit 52 is shown comprised of: a local oscillator (LO) frequency synthesizer 68 for generating frequency stable local oscillator signals STALO 1 and STALO 2, a novel RF waveform generator 70, an up-converter 72, an IF signal select section 73, an IF receiver section 74, an analog to digital (A/D) converter 76, a buffer memory 78, and finally a pair of control units consisting of a radar timing control (RTC) unit 80 and an exciter/receiver timing and control (ERTC) unit 82.

In the known prior art such as shown in FIG. 1, the E/R unit 30 employes a set of four surface acoustic (SAW) analog devices, not shown, to generate linearly varying or ramped frequency modulated (chirped) waveforms for a SAR ground mapping mode. These waveforms are pulse compressed upon return by matched filters in the IF section of the receiver, yielding up to 10 foot range resolution. This data was then analog to digitally converted at rates up to 50M samples per second for processing.

In order to provide a capability of resolutions in range of 1 meter (MHR) and 1 foot (UHR) in accordance with the present invention, the RF waveform generator 70 includes, inter alia, a digital waveform synthesizer 80 comprising a direct digital synthesis (DDS) hybrid waveform synthesizer. The details of this apparatus are shown in FIG. 5.

Figure 5:
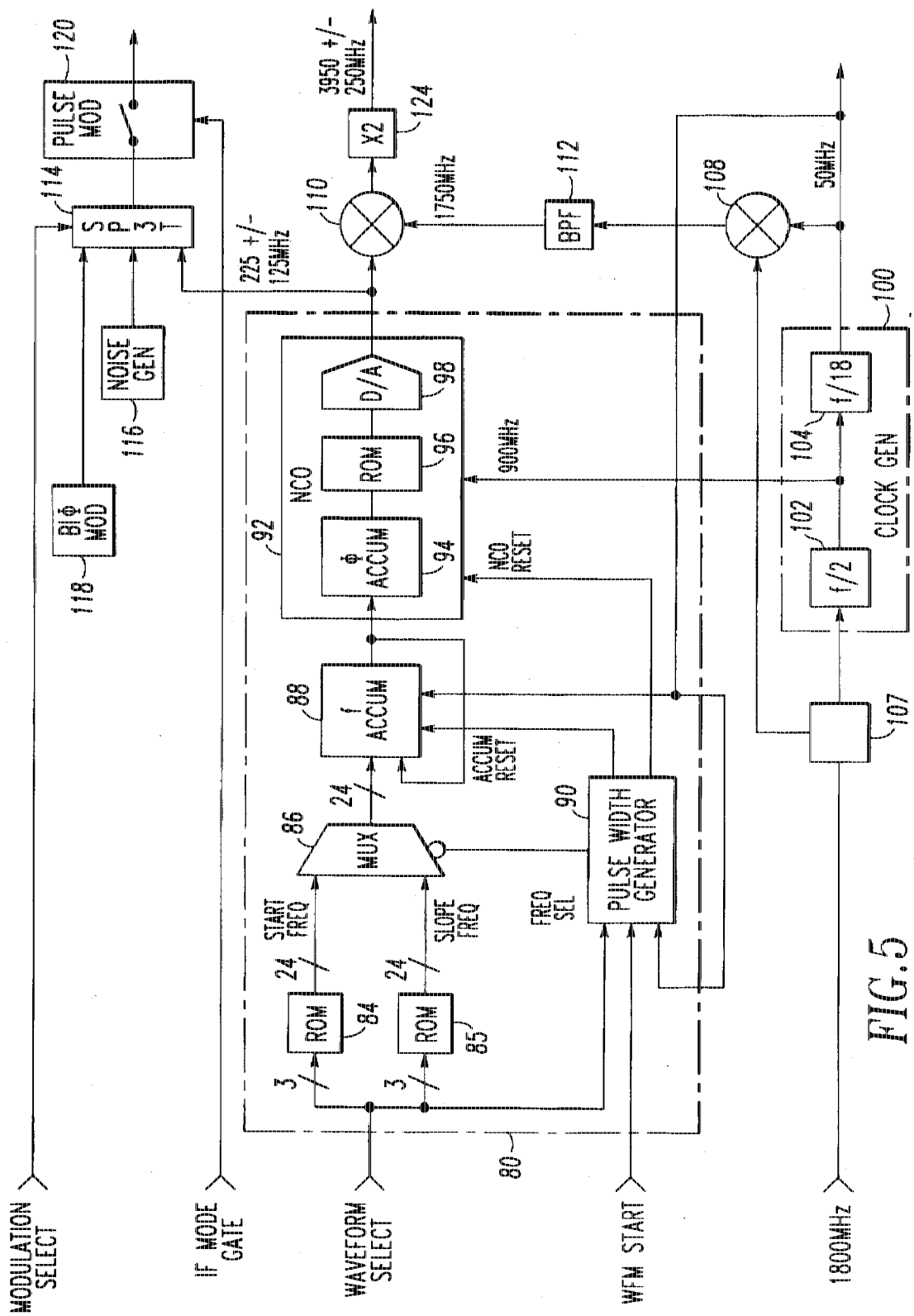
FIG. 5 is an electrical block diagram illustrative of the details of the RF modulator section included in the exciter/receiver portion shown in FIG. 4.

Referring now to FIG. 5, the DDS 80 is shown including a pair of read only memories (ROMs) 84 and 85, a multiplexer 86, a frequency accumulator 88, and a numerically controlled oscillator 92, controlled by a pulsewidth generator 90. The frequency accumulator 88 generates digitized frequency words which are fed to the numerically controlled oscillator (NCO) 92 to select the output frequency. The NCO 92 is comprised of a phase accumulator 94, a ROM 96, and a digital to analog (D/A) converter 98. The dual accumulator configuration of elements 88 and 94 generates a "chirp" waveform on the fly based on start frequency and frequency slope control words from the ROMs 82 and 84, in response to waveform select signal from the ERTC unit 82. The first or frequency accumulator 88 is comprised of discrete ECLIPs logic components operating at 50 MHz applied from a frequency divider 100 and is configured to be 24 bits wide. The second or phase accumulator 94 is an application specific integrated circuit (ASIC) component and is packaged as a hybrid with the ROM 96 which comprises a sine look-up table and a gallium arsenide (GaAs) digital to analog (D/A) converter 98. The phase accumulator 94 is 32 bits wide and operates at 900 MHz by a clock provided by a clock generator 100.

The clock generator 100 is shown in FIG. 5 consisting of two f/2 and f/18 series connected frequency dividers 102 and 104 coupled to an 1800 MHz reference signal from an S band signal generator 106 (FIG. 4) via a signal splitter 107. The first frequency divider 102 divides the 1800 MHz input signal by a factor of 2, while the second frequency divider 104 divides the 900 MHz output of the frequency divider 102 by a factor of 18 to provide the required 50 MHz output.

The 50 MHz output from the clock generator 100 is commonly fed to the RTC 80 (FIG. 4), pulsewidth generator 90, frequency accumulator 88, and to a signal mixer 108 which also receives the 1800 MHz reference signal from the signal splitter 107 and outputs a difference frequency of 1750 MHz. This signal is coupled to another mixer 110 through a bandpass filter 112.

The output of the digital waveform synthesizer 80 comprises a chirp signal centered at 225 mHz. This signal, which is linearly swept in frequency is commonly applied not only to the mixer 110, but also to a three position mode selection switch 114 which additionally receives inputs from a noise generator 116 and a biphase modulator signal from a modulator 118. The mode select switch 114 is shown connected to a pulse modulator 120. Accordingly a noise, pulsed CW, CW, bi-phase modulated or chirp modulated signal can be applied to the up-converter 72 shown in FIG. 4.

The chirp signal outputted from the mixer 110 is also doubled in a (X2)frequency multiplier 124 so that it is up-converted to C-band, i.e. 3900 +/−257.5 MHz for use in a known "stretch" mode of operation, which uses a chirped reference signal for down conversion to an IF signal. For the one meter (MHR) mode, the chirp signal bandwidth is 206 MHz and for the one foot (UHR) mode, the chirp bandwidth is 515 MHz.

Referring now back to FIG. 4, the local oscillator frequency synthesizer 68 is shown including, in addition to the S-band generator 106, a channel step generator 126, and a Ku band up-converter 128. An RF switch device 130 is adapted to connect either the output of the step generator 126 or the C-band chirp signal from the frequency multiplier 124 of the waveform generator 70 to a mixer 132. The signal mixer 132 is connected to a signal splitter 134 which is adapted to provide two stable local oscillator STAL01 signals which are respectively coupled to one mixer 136 of a pair of signal mixers in the up-converter 72 and one mixer 138 in a pair of signal mixers in the down-converter portion of the ANT unit 22 (FIG. 4).

Additionally, the 1800 MHz output from the S-band generator 106 is fed via signal coupler 107 to a second signal splitter 140 which outputs a second pair of stable local oscillator STALO2 signals which are shown respectively coupled to the other mixer 142 in the up-converter 72 and the other mixer 144 of the down-converter of the ANT unit 22.

In operation, the LO synthesizer 68 shown in FIG. 4 accepts an RF chirp input from the waveform generator 70 for modulation of the STALO 1 outputs in the "stretch" SAR mode. This chirped signal is then used for up-conversion to KU-band RF transmission by the mixer 132 and the KU band up converter 128. In all radar modes (except stretch) the output of the channel step generator 126 is used for the STALO 1 signal. Received energy is processed such that the received RF signals are mixed with the STALO 1 and STALO 2 signals for down-converting the signal to an IF in the ANT unit 22.

In radar modes not requiring MHR and UHR resolution, the IF output of the ANT unit 22 is compressed using surface acoustic waves (SAW) devices shown by reference numeral 146 located in the receiver section 74. The IF is coupled into and out of these devices by two switch elements 148 and 150.

For a mode where one meter (MHR) and one foot (UHR) resolution is required, the received RF energy is demodulated on reception, with the same chirped STALO 1 signal used for up-conversion in converter 72 on the transmission side. This is achieved by the switch element 130 coupling the mixer 132 to the C Band chirp signal from the waveform generator 70 as noted above. Using the same chirped LO signal for both up-conversion and down-conversion, as indicated above, implements "stretch" processing. For the stretch modes, the IF signals from the antenna 22 contain range-dependent frequency information. Stretch processing permits high resolution signals to be detected using modest IF and analog to digital converter bandwidths.

Such IF signals are selectively fed in the stretch mode to four parallel IF receiver channels via the IF signal select section 73 in the IF receiver portion 74, each one of which has a respective linear bandpass filter (BPF) as shown by reference numeral 148. The bandwidth of these filters is each just less than the Nyquist frequency of the A/D converter paired to the specific receiver channel and thus effectively limit the range swath of the ground map being processed by that channel during a SAR operational mode. The bandwitdth of the MHR bandpass filter is 13 MHz and the bandwidth of the UHR bandpass filter is 41 MHz.

Table I below sets forth the functional characteristics implemented by a E/R unit 52 including an RF waveform generator 70 as shown in FIG. 4.

TABLE 1

| PARAMETER | VALUE |
| --- | --- |
| MODULATION CAPABILITIES | NOISE, PULSED CW, CW, BI-φ, & CHIRP |
| CHIRP BW (NORMAL) | 72.5 MHZ MAX |
| CHIRP BW (STRETCH) | 515 MHZ MAX |
| CHIRP RATE (MIN) | 0.0027 MHZ/μs |
| PHASE ACCUMULATOR | 32 BITS |
| FREQUENCY ACCUMULATOR | 24 BITS |
| PHASE ACCUMULATOR SPEED | 900 MHZ |
| FREQUENCY UPDATE RATE | 50 MHZ |
| FREQUENCY SWITCHING | PHASE CONTINUOUS |
| NUMBER OF WAVEFORMS | 8 |
| PULSEWIDTH | 81.92 μs @ 20 ns RESOLUTION |

The two digital timing and control modules 80 and 82 shown in FIG. 4 control the waveform generator 70 as well as to select mode dependent hardware paths due to the fact that the waveform generator 70 is involved in both transmission and reception while operating in the stretch radar mode.

Referring now to FIG. 6, shown thereat in block diagrammatic form is the programmable signal processor (PSP) unit 54 of FIG. 2. The PSP 54 is shown comprised of, among other things, a bulk memory 152 including three identical units, $152_1$, $152_2$ and $152_3$ and which are adapted to store 1 million 32-bit words each. Each bulk memory unit $152_1$, $152_2$ and $152_3$ includes four bulk memory (BM) modules $154_1$, $154_2$, $154_3$ and $154_4$ each having a memory capacity of 250,000 words. Each of the four BM modules $154_1$ ... $154_4$ is bidirectionally connected to an XBAR bus 156 which is adapted to couple the modules to five identical complex arithmetic vector processors (CAVPs) $158_1$, $158_2$, ... $158_5$, E/R interface input port 160 and a digital display generator interface output port 162 by a "wired interconnects" data bus shown by reference numeral 164. The five CAVPs $158_1$ ... $158_5$ are additionally bidirectionally coupled to a scalar processor (SP) 166 via a ring network type data passing bus 168. Data processing is controlled by a signal processor controller (SPC) shown by reference numeral 170. A control bus 172 is further shown interconnecting the five CAVPs $158_1$ ... $158_5$ and SP 166.

Figure 7:
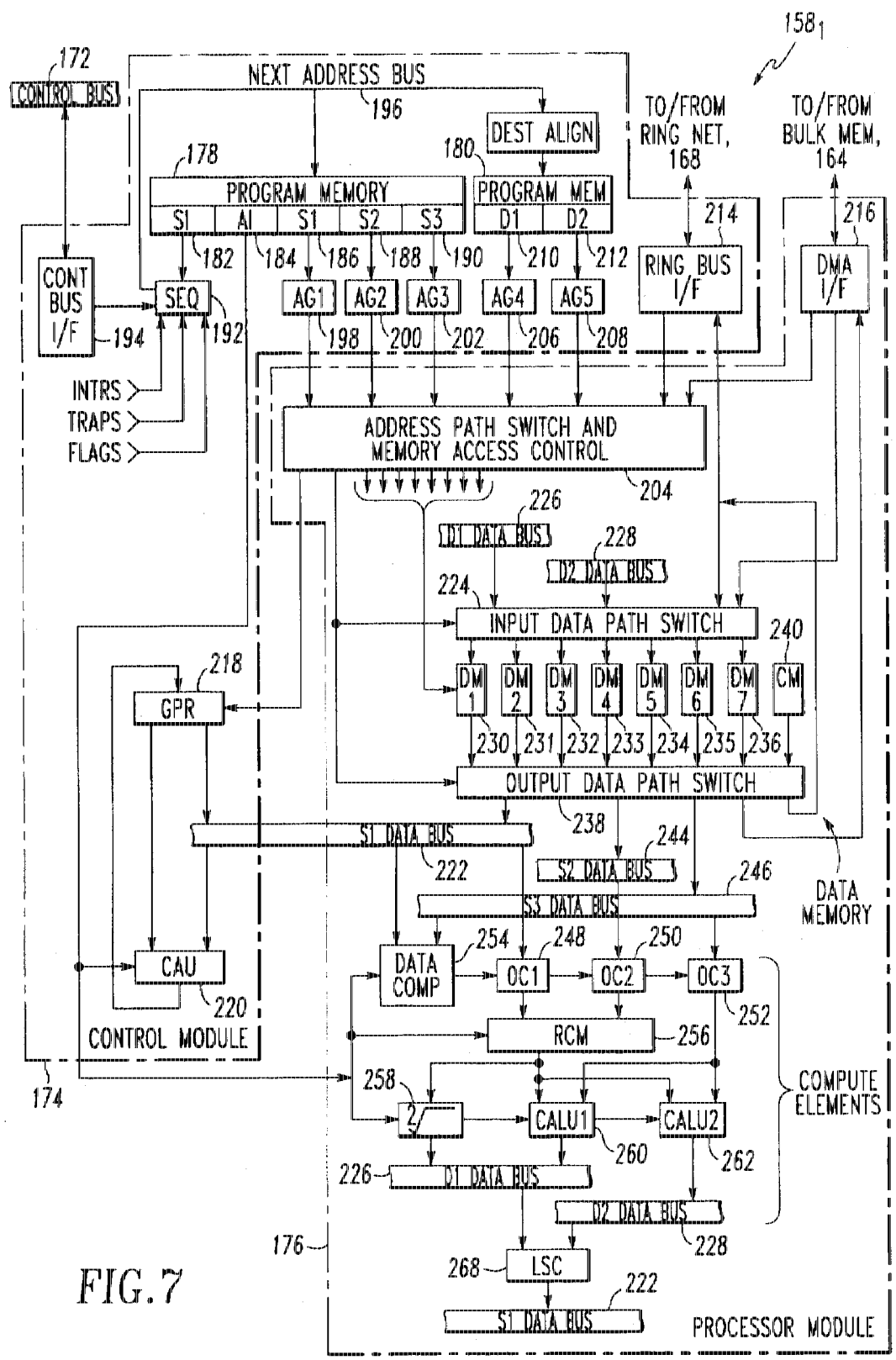
FIG. 7 is an electrical block diagram illustrative of one of the complex arithmetic vector processors (CAVP) shown in FIG. 6.

FIG. 7 is illustrative of one of the CAVPs, i.e. CAVP $158_1$ and comprises a high throughput signal processor for performing processing tasks such as ADD, SUBTRACT and MULTIPLY on vectors of complex data. As shown in FIG. 7, CAVP $158_1$ includes, among other things, two interconnected units, a control module 174 and a processor module 176.

The control module 174 includes a 4096 word memory consisting of a source program memory 178 and a destination program memory 180. The source program memory 178 includes five 116 bit horizontal microinstruction read/write storage registers comprising an SI register 182 for sequencer instructions, an AI register 184 for arithmetic instructions and three $S_1$, $S_2$ and $S_3$ data source registers 186, 188 and 190. The sequencer instruction source SI register 182 connects to a sequencer 192 which connects to the SPC control bus 172 (FIG. 6) via control bus interface unit 194. The sequencer 192 controls the sequence of operation of the source program memory 178 and the destination program memory 180 through a "next address bus" 196 in response to a series of interrupts, traps and flags which are applied under the control of the SPC 170 in FIG. 6. The S1, S2 and S3 data source registers 186, 188 and 190 are coupled to respective address AG1, AG2 and AG3 generators 198, 200 and 202, which in turn are connected to an address AG4 and AG5 path switch and memory access controller 204 which is also connected to a pair of address generators 206 and 208 which are coupled back to respective destination memory registers 210 and 212.

The control module 174 also includes a ring bus interface 214 which connects to the ring network bus 168 shown in FIG. 6, as well as a bulk memory interface 216 which connects back to the wired interconnects bus 164 connecting the bulk memory units $152_1$, $152_2$ and $152_3$. The control module 174 also includes one or more general purpose registers (GPR) 218 and a control arithmetic unit (CAU) 220. As shown, the CAU 220 is controlled in accordance with arithmetic instructions from the AI memory register 184. The CAU 220 is connected in a loop with the GPR 218 through an S1 data bus 222 associated with the S1 source memory register 186.

The processor module 176, in addition to including the address path switch and memory access controller 204 includes an input data path switch 224 connected to D1 and D2 data busses 226 and 228 associated D1 and D2 destination program memory registers 210 and 212. Further as shown, the input data path switch 224 is coupled to the controller 204 as well as the ring bus interface unit 214 and the bulk memory interface unit 216. The input data path switch 224 is coupled to the inputs of seven DM1, DM2, . . . , DM7 data memory registers 230, 231, . . . , 236. The output of these registers couple into an output data path switch 238 along with a coefficient memory register 240 for use in connection with implementing a Fast Fourier Transform (FFT) function. The output data path switch 238 is connected to the S1, S2, and S3 and data source memory busses 222, 244 and 246.

As can further be seen in FIG. 7, the three data source busses 222, 244 and 246 feed three OC1, OC2 and OC3 operand conditioner units 248, 250 and 252 which operate in combination with a data comparator (DATA COMP) unit 254 which also receives arithmetic instruction data from the arithmetic instruction (AI) program memory register 184 in the control module 174 via a signal bus 254 which also connects to a real/complex multiplier (RCM) 256 and a square root look up table 258 as well as the CAU 220 located in the control module 174.

The RCM 256 and the OC3 operand conditioner 252 feed into a pair of complex arithmetic logical (CALU1 and CALU2) units 260 and 262 along with the square root look up tables 258 and 260, coupling which in turn feed their respective outputs into D1 and D2 data busses 226 and 228 associated with the D1 and D2 destination program registers 210 and 212. Coupled between the D1 and D2 data busses 226 and 228 and the S1 data bus 222 is a leading sign counter unit 268.

The architecture of the complex arithmetic vector processor (CAVP) shown in FIG. 7 is designed for pipeline processing which, as well known, requires that an operation or function be divided into smaller pieces or stages through the system. In this invention 12 stage processing is implemented. Data flows serially from one stage to the next on each clock cycle which has a length of 100 n sec. This means that each pipeline stage is capable of executing its function within the time period of a single clock cycle.

To process a single point, i.e. a data point having a discrete numerical value through an N-stage pipeline, requires a total of N-clock cycles; however, a new data point can be inserted into the pipeline every clock cycle. Therefore, at a single instant in time, there are N-points in the pipeline, one at each stage, in successive stages of completion.

Accordingly, for the CAVP shown in FIG. 7 in its role as the radar signal processor, one of the most frequent signal processing operations which is performed is the Fourier transformation and more importantly, the Fast Fourier Transform which requires the execution of an operation known as the "FFT Butterfly" which has the following form:

$$A \pm B*C \quad (1)$$

The CAVP architecture of FIG. 7 is designed to (1) operate the execution of the butterfly by rewriting the above butterfly expression (1) into two parts as follows:

$$D1 = S3 + S1*S2 \quad (2)$$

$$D2 = S3 - S1*S2. \quad (3)$$

It is apparent from the above that three source operand busses and two destination busses are required. They comprise the S1, S2, S3 data busses 222, 244 and 246 and the D1 and D2 data busses 226 and 228. With these five busses, five memory address generations are required and are implemented by the address generators AG1, AG2, . . . , AG5, designated by reference numerals 198, 200, . . . , 208. In addition, in order to obtain both sum and difference values in one clock cycle, two arithmetic logic units are required. These are shown implemented by the CALU1 260 and CALU2 262.

In CAVP $158_1$, as shown in FIG. 7, data words are processed in 32 bit batches, with processing operations being carried out in any one of the following well known formats: complex, packed real, or double precision. Double precision data can be real (32-bit word) or complex (a 32-bit I word and a 32-bit Q word). Irrespective of the format, all data is presented in fixed two's complement fractional notation. The CAVP architecture implements what is termed "block floating point". Rather than having an exponent concatenated to each data word, one exponent is found by first performing a leading sign count (LSC), i.e. count the number of sign bits until the first significant bit of each element of a vector is found. Once the largest element is found (the minimum LSC), all elements of the vector may be scaled, i.e. shifted such that the repeated bits are eliminated from the largest data word. The LSC thus becomes the exponent.

SOFTWARE PROCESSING

Figure 8:
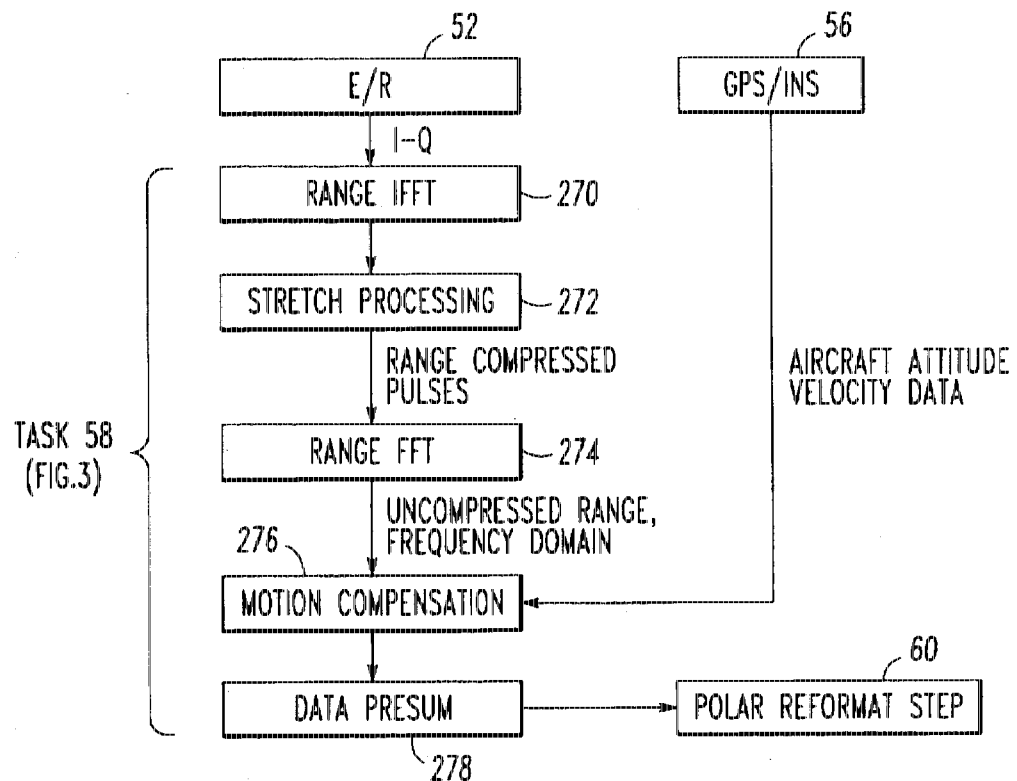
FIG. 8 is a flow chart illustrative of the signal processing for carrying out a return signal corrections step carried out by the subject invention.

Considering now the details of the signal processing tasks 58, 60, 62 and 64 required in the subject invention and shown in FIG. 3, FIG. 8 depicts a flow chart for the data processing involved in the corrections step 58. This task is performed in real time while the radar system 50 is continuing to collect high resolution data in a SAR mode of operation and is accomplished by dividing the processing equally among four CAVP1–CAVP4 of the five CAVPs $158_1$ . . . $158_5$ of the programmable signal processor (PSP) 54. Complex video data including in-phase (I) and quadrature (Q) components is fed from the E/R unit 52 in batches of 512 pulses and wherein each CAVP, for example CAVP1 through CAVP4, shown by reference numerals $158_1$, $158_2$, $158_3$ and $158_4$, processes 128 pulses each. Two purposes of corrections processing are: (1) to compensate for stretch-processing induced phase errors; and (2) to motion-compensate the radar data so that energy coming from the center of a selected SAR map is range aligned and phase aligned according to the aircraft attitude and velocity data received by the GPS/INS system 56 (FIG. 2).

Correcting for stretch induced phased errors is accomplished by a Fourier transformation of the I-Q data into the compressed range domain by an inverse FFT step 270. This is followed a stretch processing step 272 achieved by complex multiplying the data by a vector of complex phasors. The phase of this complex vector is a quadratic function whose coefficient is determined by the sweep rate and the system resolution. After the stretch correction step 272, the data is Fourier transformed back to uncompressed range data or frequency domain as shown by step 274. A precision motion compensation step 276 is then performed in the frequency domain. Motion compensation is nothing more than temporarily adjusting the received data to make a scatter at the center of the scene appear as if it were stationary. This is done by "slipping" the data, that is, multiplying it by a complex phase ramp in the frequency domain. The starting phase and slope of the phase ramp is determined by the time-delay needed to phase-align the broadband energy at the map center. The parameters from which the CAVPs $158_1$, $158_2$, $158_3$ and $158_4$ compute this range slip correction are determined in the scalar processor 166 and are delivered back to the CAVPs with each cue to process the next batch of 512 pulses. They consist of two complex values per pulse, defined as C1 and C2.

With respect to one of the values, for example C1, FIG. 9 depicts the computational ordering by which each CAVP $158_1 \ldots 158_4$ generates the powers of C1 required to implement corrections for N=512 ranges according to the expression:

$$COR(n)=C2.C1^n, \text{ for } n=1, \ldots, 512 \qquad (4)$$

To limit processing time and to reduce truncation error in 16-bit integer multiplication (RCM) carried out in the multiplier 256 (FIG. 7), the number of multiplications requiring reuse of the product is kept to a minimum. This is accomplished by generating powers of C1 in subgroups of 8, whose exponents are themselves multiples of 8. In this way the complete set of $C1^n$ is obtained by groups of multiplications, ordered to minimize both reloading of S1, S2, S3 source registers 186, 188 and 190, and to avoid waiting for products to reach their destination D1, D2 registers 210 and 212.

The correction task 58 also involves filtering and presumming the corrected pulses as shown by step 278 in FIG. 8. Presumming is confined exclusively to the fifth CAVP, i.e., CAVP $158_5$. The presum size and filter coefficients are determined by the scalar processor 166 and delivered to CAVP $158_5$ prior to each image map. The presummed pulses, like raw complex video data, are stored in 16 bits-I and 16 bits-Q. The final output of the presum computational step 278 for each map is 1024 azimuth (cross-range) samples by 512 frequency (range) samples of complex data.

FIG. 10 is a diagram illustrative of the filtering carried out in the presum step 278. As shown, it consists of a summation of five sets, $280_1$, $280_2$, $280_3$, $280_4$ and $280_5$ of consecutive pulses 282 of a pulse stream designated by reference numeral 284, each set containing a number of pulses equal to the presum-size as noted by reference numeral 286. The process of computing one presum pulse involves multiplying each of the input pulses 282 by a corresponding filter coefficient selected from five presum-size sets of filter coefficients, which are reused for each presummed pulse shown by reference numeral 288, and adding it to the summation. The filter coefficient is selected according to where the input pulse 282 is positioned relative to the other input pulses in the sequence $280_1, \ldots 280_5$. The diagram of FIG. 10 depicts 512 pulses being input as a batch to the filter and presum computational step 278 in the midst of acquiring a plurality of such batches for an entire map.

Some number of presum pulses 288 may have already been computed and stored so that the label "presummed pulse 1" really represents the first presum pulse for the present batch of 512 pulses. Each time the presum task 278 finishes a batch of 512 input pulses, it generates a cache of pulses that will be needed when it begins the next batch of 512 pulses. This cache is between four and five times the presum size and varies in size from batch to batch if 512 pulses are not evenly divisible by the presum size.

The diagram of FIG. 10 labels these pulses which have not been used in five successive presum pulses as saved pulses shown by reference numeral 290. The category "unused" pulses is indicative of the fact that the batch size of 512 is not usually an integral multiple of the presum size, i.e. some fraction of the presum size of pulses is not used once until the next batch of 512 pulses is processed.

The use of one CAVP $158_5$ for presumming and four CAVPs $158_1, \ldots 158_4$ for correcting is a deliberate underutilization of the CAVPs in terms of processing time. That is, the four correction task CAVPs $158_1, \ldots 158_4$ are faster than the current data acquisition rate in order to accommodate any future changes such as an increased number of ranges. This utilization also leaves them free to make updates to the display brightness and to the tables of brightness transfer functions (BTF) of the map currently being displayed. This update procedure is invoked in response to user-input during acquisition of video data for the next map. The correction task 58 including and presumming is performed in real time, while the radar is collecting high resolution data. The remaining tasks 60, 62 and 64 are performed during the end of scan period. Because it often takes 10 sec or more to form a high resolution aperture, it is only necessary to limit the end of scan period to four seconds to achieve a real-time capability.

The practical limit beyond which an unfocussed SAR image becomes blurred at its edges is called the "blur radius". It is defined as the target radius that results in a maximum of one cell of slant range and cross-range migration during a coherent integration interval. The blur radius BR as a function resolution cell is defined by the following relationship:

$$BR = \frac{2 \cdot \Delta r}{\lambda} \qquad (5)$$

where $\Delta r$ is the range/cross-range resolution and $\lambda$ is the wavelength. With a display size of 488×488 pixels and resolution of 10 feet per pixel, the image maps within the blur radius of 320 resolution cells. However, as the resolution is increased to 1 meter and further to 1 foot, greater portions of the image lie outside the blur radius. This requires a use of the polar reformatting step 60 (FIG. 3) to aid in focussing the image.

Polar reformatting involves the process of transforming data from a polar (R,Θ) coordinate system to an equally spaced $(f_x, f_y)$ rectangular coordinate system.

In reformatting polar data into a rectangular grid in accordance with this invention, it is first necessary to compute the precise angle of each cross-range cell. Since the angle to the map center is not in general linear in time, the scalar processor (SP) 116 in FIG. 6 first computes angular differences between successive presum pulses 288 (FIG. 10) and then feeds them to the CAVP's $158_1, \ldots, 158_5$. This is done after all the realtime presum data has been computed and the map-end processing has begun. All five CAVP's $158_1, \ldots, 158_5$ participate in polar reformatting with four of the CAVP's $158_1, 158_2, 158_3$ and $158_4$ reformatting the first 412 range indices and the fifth CAVP $158_5$ reformatting the remaining 100 range indices.

Figure 11:
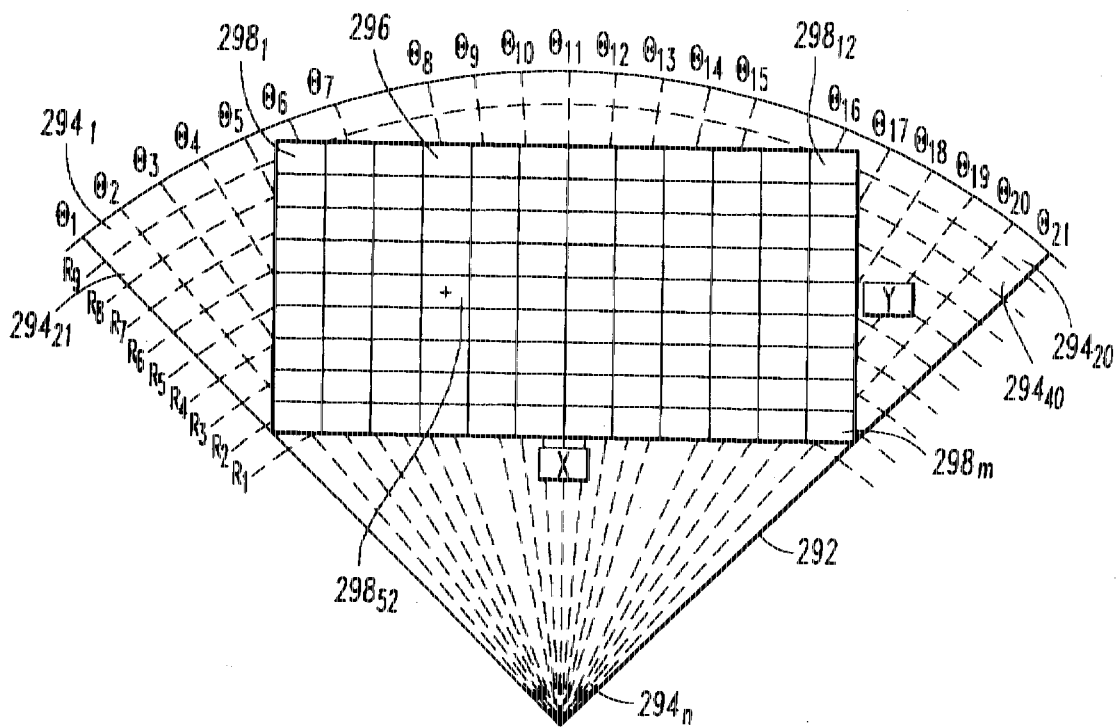
FIG. 11 is a diagram illustrative of a polar reformatting procedure carried out by the subject invention.

The polar reformatting process 60 is shown in FIG. 11 and consists in starting in a near corner of an array 292 of polar cells $294_1, \ldots 294_n$ and generating an inscribed rectangular grid 296 of rectangular cells $298_1 \ldots 298m$ to overlay the polar array 292. The resampling involves selecting rectangular cells or pixels successively, and for each one of these rectangular cells, for example cell $298_1$ shown in FIG. 12, the range and azimuthal angle to the cell center (c) is computed. The polar coordinates of the rectangular pixel $298_i$ are used to find the closest polar cell $292_i$ containing presumed radar data. Having established the nearest polar cell $298_i$, the I-Q presum pulse data corresponding to that cell and those adjacent to it are mapped into the rectangular cell $298_i$.

The mapping of adjacent cross-range polar cells $294_{i-1}$ and $294_{i+1}$ is performed according to the amplitude of a SINC function which is expressed as:

$$\text{SINC}(x) = \text{SIN}(x)/x \qquad (6)$$

evaluated at the rectangular cell center C.

To the extent that this function has significant amplitude in the adjacent cross-range cells $294_{i-1}$ and $294_{i+1}$, the I-Q data from these cells are added to the rectangular cell $298_i$. The decision whether to use an adjacent cell's $294_{i-1}, 294_{i+1}$ data is based on having a maximum proximity, as a fraction of a cell width to the center C of the rectangular cell. The fraction of the I-Q data from eligible cell is determined by the magnitude of the overlap of the SINC function with the eligible cell. For the cell $298_{52}$ shown in FIG. 11, SINC weighted I-Q data from the cell between the polar angles $\Theta 8$ and $\Theta 9$ and between ranges R3 and R4 is used in the accumulated mapping. If the nearest polar cell $298_i$ were better aligned with the cell $298_{52}$, data from the cell between polar angles $\Theta 6$ and $\Theta 7$ and between ranges R3 and R4 would also be used in the accumulated mapping.

The mapping is linear in range, that is, fractional according to the overlap of polar cells $294_i, 294_j$ with the rectangular cell $298_i$ in question. The accumulation on cross-range polar cells, described above, is also performed on the nearest adjacent polar range cell. In the example, since there is a small overlap with the polar cell between ranges R4 and R5, this cross-range accumulation is computed from data from the cell which is between polar angles $\Theta 7$ and $\Theta 8$ and between ranges R4 and R5. A proportionately small amount of this cell's accumulated cross-range data would be added to that of the closest cell is in order to create I-Q data to be finally identified with the rectangular cell $298_i$. The implementation of this process makes use of all five CAVP's $158_1$, $158_2$, $158_3$, $158_4$ and $158_5$, with four CAVP's $158_1$, $158_2$, $158_3$, $158_4$ reformatting 103 range indices each and the fifth CAVP $158_5$ reformatting the remaining 100.

Each one of the CAVPs $158_1, \ldots 158_5$ carries out the following eight steps in polar reformatting its respective assigned presummed data:

(1) The angle of each polar cross-range cell $294_1, \ldots 294_3$ is computed using the angle $\Theta$ to the first cell $294_1$ and the accumulated angular differences $\Delta\Theta$, for example, between cells $294_{i-1}$ and $294_i$. FIG. 11 illustrates that occasional skips occur in the spacing of the polar angles, $\Theta 7$ to $\Theta 8$ and $\Theta 15$ to $\Theta 16$ intervals are intended to depict this. This occurs because periodic adjustments for range and other possible changes in the aircraft flight path of the radar platform prevent the angle to the center of the map from changing linearly in time. Therefore, although these angles correspond to identical numbers of accumulated pulses, the angles are not always equally spaced. The Scalar Processor (SP) 166 (FIG. 6), therefore, computes angular differences $\Delta\Theta$ between the successive presum pulses 288 (FIG. 10) and sends them to the CAVPs $158_1, \ldots, 158_5$. This data is delivered to the CAVPs after all the real-time presum data has been computed and the map-end processing has begun.

(2) The range R to each polar range cell $294_1, \ldots 294_n$ is next computed using the range to the first cell and the accumulated polar range difference between cells (note they are equally spaced in range since the irregularities cited above are absorbed by the cross-range spacing). The range to the map is much larger than the range and cross-range differences between cells within the map, typically more than 10,000 to 1. Consequently, power series expansions in terms of the range difference $\Delta R$ between cells, divided by the range to the cells, converge rather quickly. FIG. 11 shows many fewer cells than are actually found in a typical map and the difference between polar and rectangular cells is greatly exaggerated.

(3) Next, X and Y coordinates for each rectangular cell $298_1, \ldots 298_n$ are computed. Note that these coordinates are according to a rectangular X-Y grid aligned to the polar range and cross-range at the map center. X is the rectangular counterpart to polar cross-range, and Y is the counterpart to polar range. X and Y coordinates are each equally subdivided and are computed from starting values and differences between successive cells $298_1, 298_2, \ldots$. The same large inequality holds for rectangular cells 298 in the comparison of the range-to-cell vs. cell-to-cell differences in range, that is more than 10,000 to 1.

(4) For each rectangular range cell $298_i$, the reciprocal of its range, $1/Y_i$ is then computed. $\Delta Y$ is the separation between rectangular range cells $298_1, \ldots 298_n$, and it is small compared to the range $Y_i$, which is on the order of $16 \times 10^9$ Hz. A lookup table, located in the bulk memory 152 of FIG. 6, of reciprocals available to the CAVPs $158_1, \ldots 158_5$ is only 16-bits deep, that is 1 part in 65,536. This accuracy is not sufficient to distinguish adequately for computational purposes between ranges to adjacent rectangular cells $298_{i-1}, 298_i, 298_{i+1}$, so greater accuracy than a simple lookup is needed. A series expansion in the reciprocal range to map center, $Y_c$, is used. To achieve this, one can define a term $\Delta NY_i$, the number of rectangular range cells from map center, to be the center range index, $NY_c$, less the index to the rectangular range cell of interest, $NY_i$, so that:

$$\Delta NY_i = NY_c - NY_i \qquad (7)$$

Then the reciprocal range to cell $NY_i$ is given by the expression:

$$1/Y_i = 1/(Y_c + \Delta Y \cdot \Delta NY_i) = 1/\{Y_c \cdot [1 + \Delta NY_i \cdot (\Delta Y/Y_c)]\}. \qquad (8)$$

The ratio of range-from-center to range-to-center, $\Delta NY_i \cdot (\Delta Y/Y_c)$, is finite but small, so the approximation, $$1/[1 + \Delta NY_i \cdot (\Delta Y/Y_c)] \approx 1 - \Delta NY_i \cdot (\Delta Y/Y_c) + [\Delta NY_i (\Delta Y/Y_c)]^2 \qquad (9)$$

provides the needed accuracy. Thus, the reciprocal range to cell $NY_i$, $$1/Y_i = 1/Y_c - \Delta NY_i \Delta Y/Y_c^2 + (\Delta NY_i \Delta Y)^2/Y_c^3, \qquad (10)$$

is used in the computations now to be described.

Since the computations to be described below mix X cross-range values and Y range values, it is necessary to specify here the order in which the two dimensions are processed. The processing in this invention, therefore, executes one outer loop over rectangular range cells. For each rectangular range cell $298_j$, the rectangular cross-range cells are treated in a series of pipeline loops. This is because each CAVP $158_1, \ldots, 158_5$ processes on the order of ten times as many cross-range cells as range cells. These loops are executed many times, each nested in the outer loop, to take advantage of the pipeline CAVP architecture shown in FIG. 7. The outer loop over rectangular range cells cannot. Therefore, it is more efficient to relegate the larger number of cells to the nested loops.

(5) Following this, the range R to each rectangular cell $298_1 \ldots 298_n$ in polar coordinates is computed. Range $R_{xy}$ in polar coordinate can be expressed as:

$$R_{xy} = \sqrt{X^2 + Y^2}, \quad (11)$$

where the rectangular cross-range X dimension is measured in increments of cell-dimensions and the rectangular range Y dimension is on the order of the range to map center. Thus, $R_{xy}$ can be approximated, using the first two terms of a series expansion, as:

$$R_{xy} = Y + X^2/(2 \cdot Y). \quad (12)$$

(6) Next the index into the array of polar ranges whose value most closely matches (from below) this range, $R_{xy}$, to the selected rectangular cell, is computed. Also, the fraction of a polar range cell by which this value differs from the selected rectangular range is computed. This fractional difference is used in the linear range extrapolation described above. The computations are straight-forward, since ranges in both coordinate systems are spaced in equal increments.

(7) After (6), the index into the array of polar cross-ranges whose value most closely matches (from below) the cross-range value of the selected as a fraction of polar cross-range cell-width in order to invoke the application of the SINC function, described above, is obtained. The cross-range angles in radians are small enough per (3) so that the angles are nearly equal to their tangents, $\Theta \approx X/Y$. This avoids the need of an arctan function in computing cross-range for the rectangular cells.

Since the angles to the polar cells are not equally spaced, the index cannot be directly computed. Instead, to avoid a lengthy search, the index into the array of rectangular cross-ranges for each polar cross-range cell is first computed. This list of indices is called IPX(a), where a is the polar cross-range cell number. As long as this list is sequential, the array of polar cross-ranges is used sequentially, addressed by an index a−1. However, when, $$IPX(a+1) > IPX(a)+1 \quad (13)$$

the index a−1 is used twice since the polar array is increasing faster. When, $$IPX(a+1) = IPX(a) \quad (14)$$

the index a−1 is skipped and index a is used, instead, since the polar array is increasing more slowly than the rectangular one. The search is thus confined to this list of indices which is largely sequential. This minimizes the amount of conditional branches in the CAVP, to which pipeline architecture is ill-suited in terms of speed of execution.

(8) Finally, the cross-range accumulation of I-Q data from the nearest polar cell and its cross-range neighbors is computed. In the accumulation, the I-Q data from the next polar range cell and its neighbors is included in proportion to the fractional overlap in range (R), as described above.

In order to avoid computations which involve conditional branches, a lookup table located, for example, in DM5 shown by reference numeral 234, FIG. 7 is used containing the SINC function weights, addressed by the relative fractional cross-range displacement of the polar cells $294_1, \ldots 294_n$, with respect to the rectangular cells $298_1, \ldots 298_n$.

Figure 12:
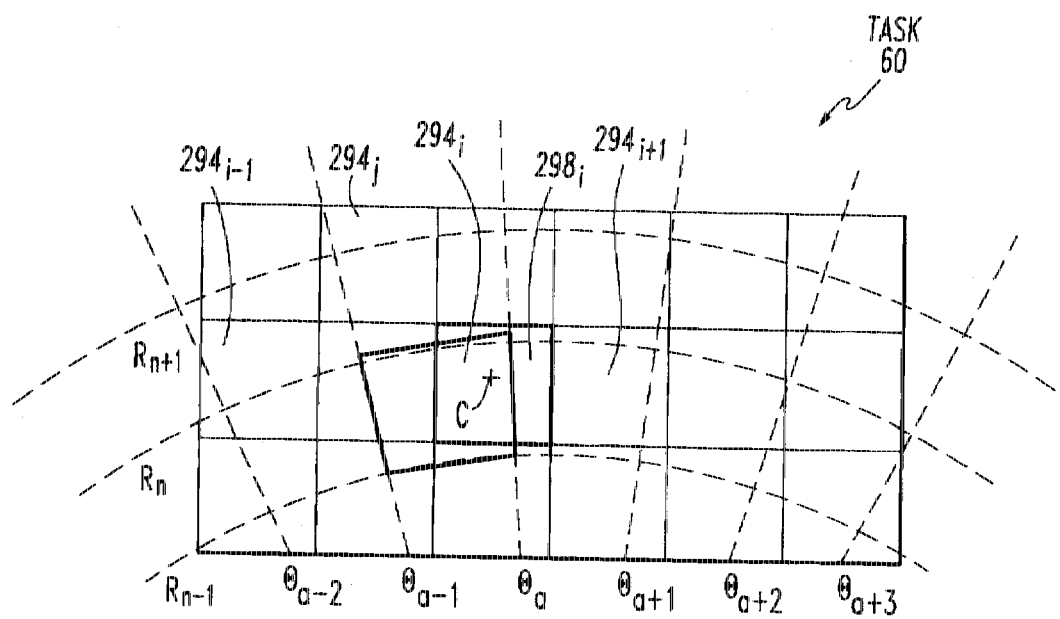
FIG. 12 is a diagram illustrative of the implementation of a SINC function included in the polar reformatting procedure shown in FIG. 11.

The foregoing is illustrated by the close-up of a hypothetical rectangular cell $298_i$ and the nearest polar cell $294_i$ in FIG. 12. The nearest polar cell $294_i$ lies between hypothetical ranges $R_{n-1}$ and $R_n$, and between hypothetical cross-range angles $\Theta_{a-1}$ and $\Theta_a$. The SINC function weight table consists of four coefficients for each entry. The sets of four coefficients are addressed according to the cross-range fractional displacement. The coefficients themselves are adjusted according to the magnitude of the SINC function, evaluated at this displacement, so that they weight the adjacent cross-range cells' contribution to the selected rectangular pixel. They are applied to the cells bounded by ranges $R_{n-1}$ to $R_n$. The first coefficient is applied to the cell bounded by cross-range angles $\Theta_{a-2}$ to $\Theta_{a-1}$, the second coefficient is applied to those bounded by $\Theta_{a-1}$ to $\Theta_a$, the third is for $\Theta_a$ to $\Theta_{a+1}$, and the fourth is for $\Theta_{a-1}$ to $\Theta_{a+2}$.

For a small fractional displacement, the first and third coefficients weight their cells a small, but finite amount. The second coefficient weights its cell by nearly the maximum amount, and the fourth coefficient is zero. As the fractional displacement increases, the first coefficient goes to zero, the second coefficient decreases, and the third becomes larger. Finally, for the largest displacements, nearly one polar cross-range cell width, the fourth coefficient becomes finite and nearly equal to the second. There are never more than three coefficients contributing at one time. The I and Q values for the data in the highlighted cell become the sum of these four polar cells, weighted by the four coefficients.

In the CAVPs $158_1, \ldots, 158_5$ the computation of the relative fractional displacement of the polar and rectangular cross-range cells is subject to truncation error. This can cause the fraction, which is supposed to be between 0 and 1, to overshoot this bound, either above or below, by a small amount. This can lead to an out-of-bounds address into the SINC table or would require further testing and adjustment of the fraction. The SINC table has a symmetry at both ends which permits pseudo-periodicity, also known as wrap-around. To save processing time and avoid discontinuity in the weighting function, the top portion of the table is replicated below the bottom of the table and the bottom of the table is replicated at the top. Now, when addresses underflow or overflow slightly due to truncation, the enlarged table can be accessed in a continuous fashion.

This process is repeated for the cells bounded by ranges $R_n$ to $R_{n+1}$, and by the same cross-range angles. The contribution from this cross-range accumulation, and that of $R_{n-1}$ to $R_n$ above, are added together, the accumulations themselves weighted by the fractional displacement in range of these polar cells relative to the highlighted rectangular cell.

Accordingly, the Polar reformatting step 60 (FIG. 3) results in 1024 cross-range samples by 512 range samples of complex I-Q data being generated. This samples of complex I-Q data being generated. This presummed I-Q data, redistributed into a rectangular format, serves as input data to another inverse IFFT transformation step 302 as shown in FIG. 13. This inverse IFFT step 302 is performed by all 5 CAVPs $158_1, \ldots, 158_5$ of FIG. 6, each processing a nearly equal number of pulses, resulting in time-domain range data being generated. The range IFFT step 302 provides time-domain data for input to the autofocus function 62 of FIG. 3, now to be carried out.

Figure 15:
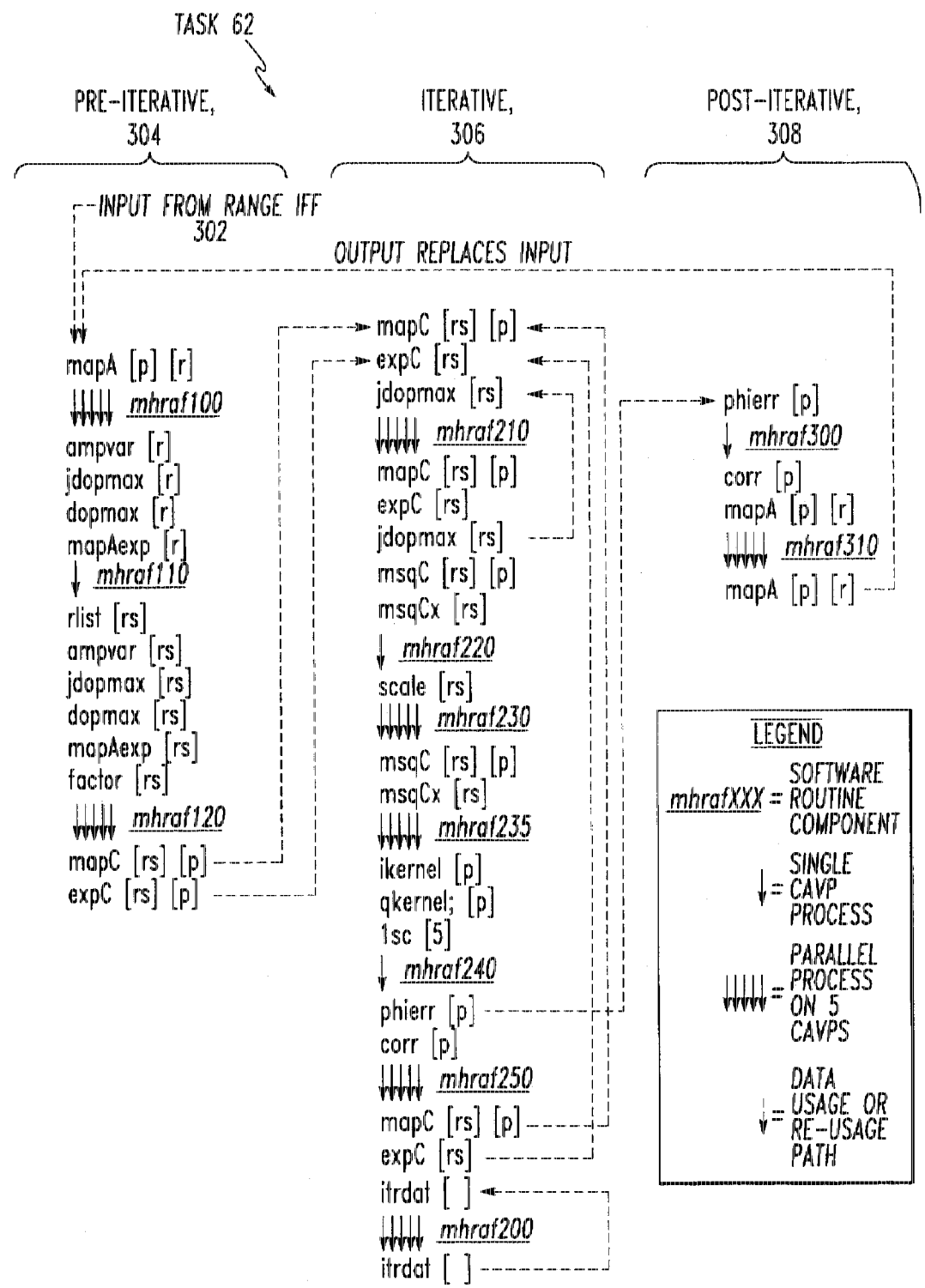
FIG. 15 is a flow chart of the autofocusing procedure of FIG. 14.

The autofocus function 62 is carried out in three steps, (a) pre-interative step 304, an iterative step 306, and a post-iterative step 308 as shown in FIG. 13 with the details thereof being depicted in FIG. 15. Autofocusing is achieved by a phase gradient autofocus (PGA) algorithm and is employed to correct ionospheric-induced phase errors as well as uncompensated platform related errors in the SAR imagery. Untreated, these errors result in severe smearing of hard target images. The PGA algorithm, was developed at Sandia National Laboratories, and offers superiority over classical sub-aperture autofocus techniques in correcting these errors. This type of algorithm is further described by Jakowitz, Eichel, and Ghiglia in "Autofocus of SAR imagery degraded by ionospheric-induced phase error", SPIE Vol. 1101, Millimeter Wave and Synthetic Aperture Radar (1989); and by Wahl, Eichel, Ghiglia, and Jakowatz in the article "Phase Gradient Autofocus—A Robust Tool for High Resolution SAR Phase Correction", IEEE Transactions on Aerospace and Electronic Systems, Vol. 30., No. 3, July 1994.

The unique characteristics of the PGA algorithm as it relates to this invention is the requirement for real-time PGA processing at or near 1 second in CAVP's $158_1, \ldots, 158_5$ (FIG. 7). An Azimuth FFT step 310 of FIG. 13 follows the autofocus process 62 and represents a post-PGA single software component process operating in parallel across the 5 CAVP's $158_1, \ldots, 158_5$ as is required to transform the cross-range dimension from the time to frequency domain prior to performance of the Image Processing step 64 (FIG. 3).

Figure 14:
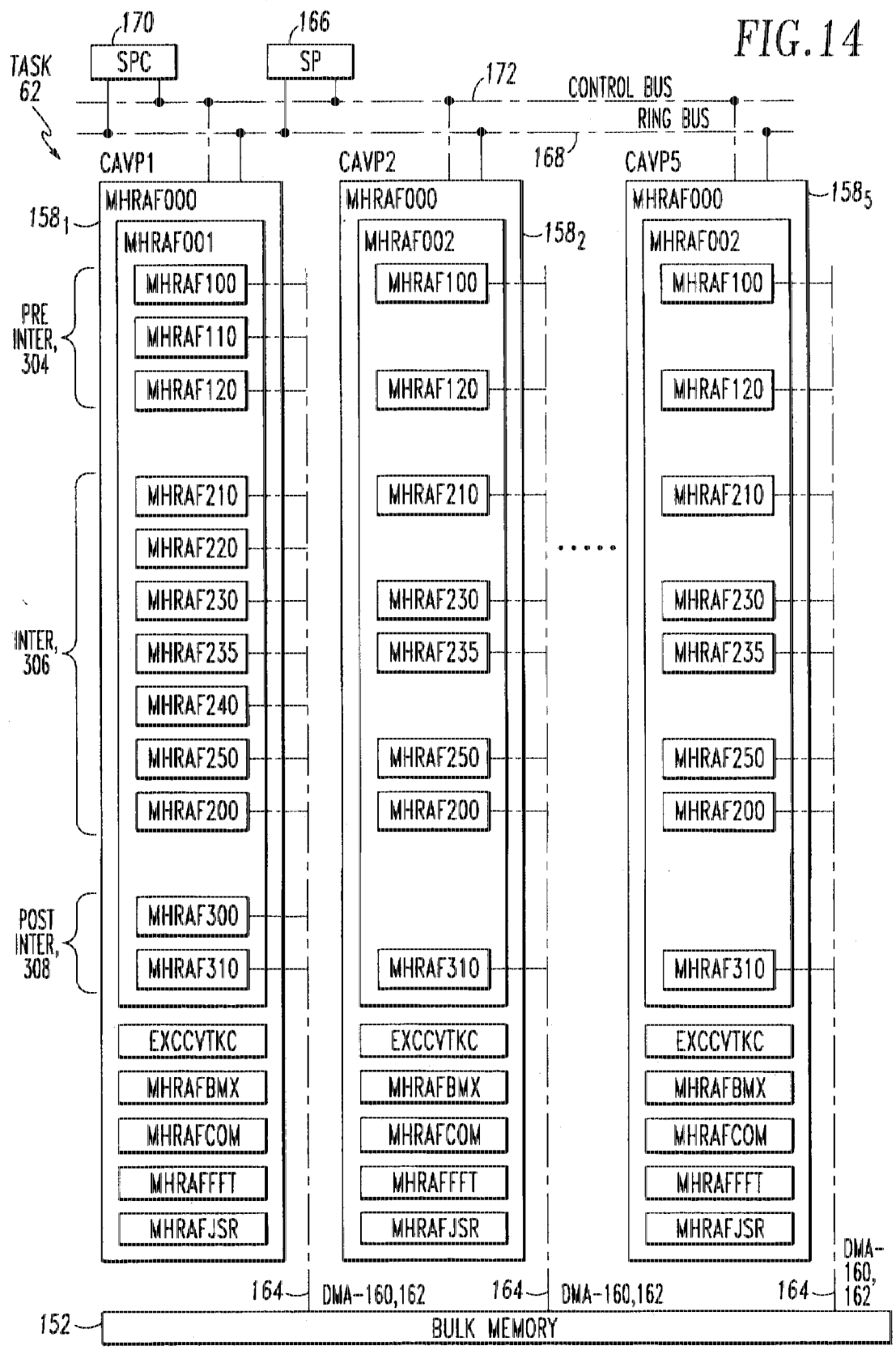
FIG. 14 is a diagram further illustrative of the autofocusing procedure of FIG. 13.

Referring now to FIG. 14, shown thereat is the various routines involved in the autofocus processing. The signal processor controller (SPC) 170 located in the PSP 54, as before provides all dispatched control to the set of CAVPs $158_1, \ldots, 158_5$ during the execution of synchronous parallel processes included in the pre-Iterative, Iterative, and Post Iterative steps 304, 306 and 308. The SPC 170 communicates with these elements via the Control Bus 172.

In the case of the medium high resolution (MHR) and ultra high resolution (UHR) autofocus operation, abbreviated (MHRAF), the SPC 170 initiates the overall task for each of the five CAVPs $158_1, \ldots, 158_5$ and provides controlled task termination via a EXCCCVTKC software routine. The Scalar Processor (SP) 166 also provides dynamic control for Autofocus Enable/Disable as well as the value for the window size to be used by the Iterative process 306. The relatively large number of synchronized parallel subprocesses contained within the Pre-Iterative, Iterative, and Post-Iterative stages 304, 306 and 308 of the MHRAF autofocus process 162 was found to be difficult and inefficient to control via the SPC 170. A novel approach was therefor designed and implemented in accordance with this invention as shown in FIG. 14 and includes MHRAF000, MHRAF001 and MHRAF002 software routines which provide control and initialization functions.

The SPC 170 initiates the execution of the MHRAF000 routine on all CAVPs $158_1, \ldots, 158_5$. The MHRAF000 routine initializes the CAVP internal tables for the MHRAF routines according to the CAVP number. It also defines a particular CAVP as the master or slave. In the subject invention CAVP 158 is defined as the master. From that point, the master CAVP $158_1$ controls the synchronized processing using the MHRAF001 routine. The slave CAVPs $158_2, 158_3, 158_4$ and $158_5$ in turn are controlled by the MHRAF002 routine.

The MHRAF001–MHRAF002 control relationship is achieved using the PSP ring bus architecture shown by reference numeral 168 in FIG. 6 and operates to pass messages which request the initiation of the MHRAF processes and report the completion of these processes.

The MHRAF routines of the Pre-Iterative step 304 are designated as MHRAF100, MHRAF110, AND MHRAF120. The routines of the Iterative step 306 comprise MHRAF200, MHRAF210, MHRAF220, MHRAF230, MHRAF235, MHRAF240 AND MHRAF250, while the Post-Iterative step 308 consists of the MHRAF300 AND MHRAF310 routines. All of these software components can access the global level data stored in the bulk memory 152 shown in FIG. 6 using direct memory access techniques to load internal data memory or restored data to bulk memory. The master CAVP $158_1$ performs those processes which occur only on a single CAVP. The MHRAF001 routine sequences through the set of Pre-Interative, Iterative, and Post-Iterative routines MHRAF100, . . . MHRAF310 until completion, at which time control is returned to MHRAF000 which cause the EXCCCVTKC to terminate the task and free a particular CAVP for the next process to be commanded at the SPC control level.

The MHRAF001 control technique is very effective for dynamically controlling the number of iterations performed during the iterative step or stage 306. It is to be noted that the MHRAF110 routine may determine that the image is not suited for effective focusing and may cause the process to EXIT at that point in the sequence. The routines shown as MHRAFBMX, MHRAFCOM, MHRAFFFT, AND MHRAFJSR contain functions which are globally used by the MHRAF software and provide bulk memory transfer, common data definition, Fast Fourier Transform, and general functions, respectively.

FIG. 15 diagrammatically illustrates the data flow of the MHRAF processor of the Autofocus step 62 as a sequence of operations due to the execution of MHRAF routines shown in FIG. 14. All of the data entities described are stored in the bulk memory 152 of the PSP 54.

Referring now to FIG. 15, an input data set mapA[p][r] from the Range FFT step 302 (FIG. 13) is first processed by MHRAF100 routine in the Pre-Interative stage 304 to produce amplitude variance data, Doppler maximum amplitude data and index of Doppler maximum amplitude data, and exponent data over the entire range dimension as represented in FIG. 15 by data sets ampvat[r], jdopmax[r], dopmax[r] and mapAexp[r]. It should be noted that in order to compute this data, the MHRAF100 routine uses an FFT in the range dimension to convert to the frequency domain as well as other PGA required techniques such as windowing and circular shifting of signal data.

The data of the data array mapA[p][r] will not be adulterated until the entire MHRAF process is completed in the three stages 304, 306 and 308 as is depicted by the dashed line running from the outside of MHRAF310 of the Post-Iterative stage 308 back to the input. This makes it possible for the MHRAF process of exit at MHRAF120 of the Pre-Iterative stage 304 or for the overall MHR/UHR imaging process to bypass the autofocus step 62 if necessary. The MHRAF110 routine selects the subset of the 40 lowest amplitude variances in the range dimension. Should the elements of the subset fail a test which evaluates amplitude variance and Doppler maximum amplitude versus acceptable level criterion, they are eliminated from the list of focus ranges rlist[rs] data for MHRAF 110. Should the number of survivors in the rlist[rs] structure fall below a selected limit, nominally 10, the process 62 terminates. This selection, goodness test, and early process termination represent customizations of the PGA algorithm that enable the implementation to achieve real-time objectives and prevent a de-focusing that results if the selected data is not within certain limits of acceptability.

The MHRAF110 routine continues beyond the goodness testing to select data subsets ampvat[rs], jdopmax[rs], dopmax[rs], mapAexp[rs], and compute factor[rs] data to be used by MHRAF120 to normalize the mapC[rs] data according to both amplitude variance and Doppler maximum. The MHRAF120 software component operates on the five CAVPs $158_1, \ldots, 158_5$ (FIG. 6) to selected the rlist[rs] ranges from mapA into the mapC[rs][p] data set using an FFT to transform the cross-range dimension to the frequency, and weighting each range by factor[rs].

The Iterative stage 306 is required to perform up to 8 iterations in order to produce the data of data array phierr[p] for the Post-Iterative stage 308. The mapC,[r][p] expC[rs] and jdopmax[rs] data arrays input to MHRAF210 come initially from the Pre-Iterative stage 304, but are updated and recycled for each iteration. The MHRAF210 software routine tracks the doppler maximum, window and circular shift the data, perform an inverse FFT on the windowed data and computes a data array msqC[rs][p] as the complex conjugate multiply of consecutive points, and perform an inverse FFT on the mapC data in order to transform back to the time domain prior to the iterative correction in software component of MHRAF250.

The MHRAF220 component of the Iterative stage 306 produces a data array scale[rs] which is used to normalize the data across the range dimension of msqC[rs][p] and exponents msqCx[rs]. The parallel MHRAF230 component performs rescaling such that all sub-arrays across [rs] have the same exponent. This is required prior to the MHRAF235 routine which performs an accumulation of [rs] ranges for each cell in the cross-range [p] dimension, to produce the complex I and Q values in the data arrays ikernel[p] and qkernel[p] and lsc[ ] which will be used to normalize results across the set of five CAVPs $158_1, \ldots 158_5$.

The MHRAF240 software component generates phierr[p] and corr[p] data arrays which represent the accumulated error and the iterative error, respectively. The corr[p] corrections data are applied to the mapC[rs][p] data which is then transformed into the frequency domain via FFT, prior to recycling through the Iterative stage 306. The MHRAF200 software component is performed at the end of each Iterative stage 306 in order to adjust all iteration dependent parameters. It should be noted that it is the MHRAF001 component which controls the Iteration loop and breaks out of the loop when the window size falls below a designated limit. At that point, the Post-iterative stage 308 is executed.

The MHRAF300 routine will produce complex corr[p] data from the accumulated phase based phierr[p] data array using a complex exponential function. The MHRAF310 component multiplies the mapA data array by the correction data in corr[p] data array over the entire set [r] of range data, replacing the original input map with a final, autofocused mapA[p][r] data array upon completion.

The approximate execution timing of the software implemented per the flow chart of FIG. 15 is summarized in the following table 2:

TABLE 2

| Number of Iterations | 2 | 3 | 4 | 5 | 6 | 7 | 8 |
|---|---|---|---|---|---|---|---|
| Time milliseconds | 720 | 780 | 840 | 900 | 960 | 1020 | 1080 |

It should also be noted that the Pre-Iterative stage 304 requires 350 msec, each Iterative stage 306 requires 60 msec, and the Post-Iterative stage 308 requires 250 msec. The total size of the MHRAF software routine 62 set is approximately 1700 CAVP instructions. All timing and size values are approximate due to the occasional need to modify the code on a sub-component level.

Referring now to FIG. 16 shown thereat is the processing involved in the image processing step 64 of FIG. 3. This invention employs four 256-point BTF lookup tables $312_1$, $312_2$, $312_3$ and $312_4$ located in bulk memory 152 from which the operator 44 (FIG. 5) selects one, using a control panel knob 314. The four BTF tables $312_1, \ldots 312_4$ have dynamic ranges of 36 dB, 42 dB, 48 dB and 54 dB, respectively. These tables convert an 8-bit input 316 to a 4-bit output, the limit of the contrast capability of the Digital Display Unit 48 (FIG. 3)

The image data is first derived, pixel-by-pixel, from the output of the azimuth, i.e. cross-range FFT step 310 (FIG. 13) and stored as 15-bit magnitudes in the bulk memory 152 by the five CAVPs $158_1$–$158_5$. The magnitudes are computed using an approximation:

$$\sqrt{I^2 + Q^2} \approx \text{Max}(|I|,|Q|) + \frac{5}{16} \cdot \text{Min}(|I|,|Q|) \qquad (15)$$

to assure processing speed without sacrificing dynamic range. The 15-bit magnitudes have an effective dynamic range of 90 dB. In order to make best use of the limited dynamic range of an 8-bit lookup table, an average magnitude is computed per step 318, as shown in FIG. 16, for each output image. The operator 44 is able to select, with another control panel knob 320, where that average 322 will fall within the selected lookup table $312_1 \ldots 312_4$. The adjustment is made by dividing the user-selected nominal brightness (gain) by the average pixel magnitude. This adjustable-gain scaling is applied to all the pixel magnitudes to create the input 316 to the BTF lookup tables $312_1 \ldots 312_4$ which is 8 bits per pixel.

The operator 44 is also given the opportunity to vary both the gain and the BTF table selection while viewing a finished map. While the data for the next map is being acquired, there is ample time for the CAVPs $158_1 \ldots 158_4$ doing the correction task to check for user input. If the user has changed the gain knob 318 or the BTF table selection knob 314 since the map was displayed, the image is reprocessed from the magnitude data and the map is redrawn. Since acquisition times are usually many seconds for the higher resolution maps, there is ample time to obtain an optimum gain and BTF for studying the current map and in preparation for better rendering the next image.

Having thus shown and decribed what is at present considered to be the preferred embodiment of the invention, it should be noted that the same has been made by way of illustration and not limitation. Accordingly, all modifications, alterations and changes coming within the spirit and scope of the invention as exemplified in the appended claims are herein meant to be included.

We claim:

1. A method of producing one meter and one foot resolution in synthetic aperture radar imagery in real time, comprising the steps of:

(a) generating and radiating wideband RF waveform signals;

(b) receiving radar return signals of the radiated RF waveform signals and thereafter down converting the frequency of the return signals and generating IF signals therefrom;

(c) generating an unfocused synthetic aperture radar map from the IF signals, said map being comprised of a complex data matrix including in-phase (I) and quadrature (Q) components;

(d) motion compensating the data of the data matrix so that the center of the map is range aligned and phase aligned in response to input signals from a global positioning system and an inertial navigation system;

(e) polar reformatting the data matrix from a polar coordinate format inherent in said data to a rectangular coordinate format;

(f) autofocusing the data matrix into a focused image; and (g) processing the autofocused image and generating a visual display of the radar map therefrom.

2. A method according to claim 1 wherein step (d) additionally includes the step of presumming the data into data sets prior to the step (e) of polar reformatting.

3. A method according to claim 2 wherein said step (a) includes generating a chirp or linear FM waveform and said step (b) includes down-converting with a chirp or linear FM waveform reference signal to implement a stretch mode of operation.

4. A method according to claim 3 wherein said reference signal used in said step (b) of down-converting is the same chirp or linear waveform signal used in said step (a) of generating the wideband RF waveforms.

5. A method according to claim 2 wherein said step (d) additionally includes the step of correcting the data matrix to compensate for stretch mode induced phase errors prior to the step of motion compensation.

6. A method according to claim 5 wherein said step of compensating for stretch mode induced phase errors is preceded by the step of transforming the data into the range domain and then multiplying the range data by a vector of phase angles, one for each range element derived from the step of transforming into the range domain.

7. A method according to claim 6 and wherein said step of motion compensating is preceded by the step of transforming the data from the range domain into the frequency domain.

8. A method according to claim 7 wherein said step of transforming the data into the range domain and then back into the frequency domain includes Fourier transformation steps.

9. A method according to claim 7 wherein said step (d) of motion compensating comprises multiplying the data by a complex phase ramp in the frequency domain and where a starting phase and a slope of the ramp are determined by the time delay required to phase-align the energy at the center of said map.

10. A method according to claim 1 wherein said step (e) of polar reformatting comprises:
(i) defining a polar array of polar cells from the presummed data;
(ii) generating an internal grid of rectangular cells from the presummed data which overlays the polar array;
(iii) determining the respective polar coordinates consisting of range and azimuth angle to the center of each of the rectangular cells;
(iv) determining the closest adjacent polar cell to each rectangular cell from the polar coordinates of said rectangular cell; and
(v) mapping the presumed date of the closest polar cell into each said rectangular cell.

11. A method according to claim 10 wherein the mapping step (v) is linear in range and weighted in azimuth in accordance with amplitude of a SINC function which is expressed as:

$$SINC\ (x) = SIN\ (x)/x.$$

12. A method according to claim 1 wherein said step (e) of polar reformatting includes:
(i) defining a polar array of polar cells from the presummed data;
(ii) generating an internal grid of rectangular cells from the presummed data which overlays the polar array;
(iii) computing the angle of each cross-range cell of the polar array using the angle of a first cell and the accumulated angular differences between adjacent cells;
(iv) computing the range to each polar range cell using the range to the first cell and the accumulated polar range difference between adjacent cells;
(v) computing the rectangular coordinates for each said rectangular cell;
(vi) computing the reciprocal of the range for each said rectangular cell along with the range separation between the centers of the respective rectangular range cells;
(vii) computing the range $R_{xy}$ to each rectangular cell and polar coordinate from the expression:

$$R_{xy} = \sqrt{X^2 + Y^2}$$

(viii) computing the index into the array of polar ranges whose value most closely matches the range $R_{xy}$ to a selected rectangular cell;
(ix) computing the fraction of a polar range cell by which the $R_{xy}$ value differs from the selected polar range;
(x) determining the index into the array of polar cross-ranges whose value most closely matches the cross-range value of the selected rectangular cell;
(xi) determining the difference as a fraction of polar range cell-width in order to apply a SINC function thereto; and
(xii) computing the cross-range accumulation of complex data from the nearest polar cell and its cross-range neighbors, thereby mapping the presummed data of the closest polar cells into each said rectangular cell.

13. A method according to claim 1 wherein said step (f) of autofocusing includes transforming the data generated by the polar reformatting step to time-domain data and thereafter executing a pre-iterative routine, an iterative routine, and a post-iterative routine, and wherein each routine including a plurality of synchronized parallel subroutines executed in a plurality of complex arithmetic vector processors (CAVPs).

14. A method according to claim 13 wherein one of said CAVPs executes a pre-iterative routine including MHRAF100, MHRAF110 and MHRAF120 subroutines, an iterative routine includes MHRAF200, MHRAF210, MHRAF220, MHRAF230, MHRAF235, MHRAF240 and MHRAF250 subroutines, and a post-iterative step including MHRAF 300 and MHRAF310 subroutines and being selectively controlled and initialized by MHRAF000, MHRAF001 routines, and the other CAVPs of said plurality of CAVPs execute a pre-iterative routine including MHRAF100 and MHRAF120 subroutines, an iterative routine including MHRAF200, MHRAF210, MHRAF230, MHRAF235 and MHRAF250 subroutines, and a post-iterative routine including an MHRAF310 subroutine and being selectively controlled and initialized by MHRAF000 and MHRAF002 routines.

15. The method according to claim 14 wherein the MHRAF100 subroutine operates on ampvar[r], jdopmax[r], dopmax[r], and mapAexp[r] data arrays, the MHRAF110 subroutine operates on rlist[rs], ampvar[rs], jdopmax[rs], dopmax[rs], mapAexp[rs] and factor[rs] data arrays and the MHRAF120 subroutine operates on mapC[rs][p] and expC[rs][p] data arrays.

16. The method according to claim 14 wherein the MHRAF200 subroutines operates on an itrdat[ ] data array, the MHRAF210 subroutine operates on mapC[rs][p], expC[rs], jdopmax[rs], msqC[rs][p], and msqCx[rs] data arrays, the MHRAF220 subroutine operates on a scale[rs] data array, the MHRAF230 subroutine operates on msqC[rs][p], and msqCx[rs] data arrays, the MHRAF235 subroutine operates on ikernel[p], qkernel[p] and lsc[ ] data arrays, the MHRAF240 subroutine operates on phierr[p] and corr[p] data arrays, and the MHRAF250 subroutine operates on mapC[rs][p] and expC[rs] and itrdat[ ] data arrays.

17. A method according to claim 14 wherein said MHRAF300 subroutine operates on corr[p] and mapA[p][r] data arrays, and the MHRAF310 subroutine operates on an mapA[p][r] data array.

18. A method according to claim 14 wherein the MHRAF100 subroutine of the pre-iterative routine operates on input data following the polar reformatting step and the output data of the MHRAF310 subroutine of the post-iterative step, the iterative routine receives the data outputs of the mapC[rs][p] and expC[rs][p] data arrays of MHRAF120 of the pre-iterative stage and the data outputs of the jdopmax[rs] data array of MHRAF210, the data outputs of the mapC[rs][p] and expC[rs] data arrays of MHRAF250, the MHRAF200 routine performs an iteration on the itrdat[ ] data array, and the MHRAF300 routine of the post-iterative routine operates on the output of the phierr[p] data array of MHRAF240 of the iterative step.

19. A method according to claim 1 wherein said step (g) of processing the autofocused image and generating a visual display, includes:

(i) transforming the data autofocused in range to data in azimuth;

(ii) determining an approximation of the magnitudes of the transformed data;

(iii) determining an average pixel magnitude of the data; and (iv) adaptively controlling the brightness of the display by dividing a user selected nominal brightness or gain by the average pixel magnitude.

20. A method according to claim 19 wherein said step (i) of transforming includes a Fourier transformation.

21. A synthetic aperture radar providing one meter and one foot resolution of target images in real time, comprising:

exciter/receiver means including a multi-aperture antenna array for generating and radiating wideband RF waveform signals, receiving returns of the radiated RF waveform signals, down converting the returns and generating IF signals therefrom and generating an unfocused synthetic aperture radar map from said IF signals, said map being comprised of a complex data matrix including in-phase (I) and quadrature (Q) components;

global positioning apparatus and inertial navigation apparatus;

programmable signal processor means coupled to said exciter/receiver means for motion compensating the data of the data matrix so that the center of the map is range aligned and phase aligned in response to input signals from said global positioning system and said inertial navigation system, presumming the data of the matrix, polar reformatting the data matrix from a polar coordinate format inherent in said data to a rectangular coordinate format, autofocusing the data matrix into a focused image, processing the autofocused image and generating display signals therefrom; and display means responsive to the display signals for providing a visual display of the synthethic aperture radar map.

22. A synthetic aperture radar in accordance with claim 21 wherein said exciter/receiver means includes:

RF waveform generator means including direct digital synthesis means for generating a linearly FM modulated or chirp waveform used for both RF waveform transmission and reception of radar signals for implementing a stretch mode of operation.

23. A synthetic aperture radar in accordance with claim 22 and additionally including means for up-converting the frequency of the chirp waveform for RF transmission and means for down-converting the frequency of the chirp waveform upon reception.

24. A synthetic aperture radar in accordance with claim 23 and additionally including IF receiver means for generating an analog IF signal upon reception of a down-converted chirp waveform, and analog to digital converter means for generating a digital IF signal for use by said programmable signal processor.

25. A synthetic aperture radar in accordance with claim 22 and wherein said direct digital synthesis means for generating the chirp waveform includes at a pair of read only memories responsive to a waveform select signal, a multiplexer, and a frequency accumulator and a numerically controlled oscillator controlled by a pulsewidth generator, said frequency accumulator generating digital frequency words fed to the numerically controlled oscillator for selecting the output frequency generated thereby.

26. A synthetic aperture radar in accordance with claim 25 wherein said numerically controlled oscillator means is controlled by a clock signal from a clock signal generator and includes phase accumulator means coupled to said frequency accumulator means, a read only memory generating a digital output frequency signal, and a digital to analog converter for converting the digital frequency output signal to an analog signal for coupling to said up-converting means.

27. A synthetic aperture radar according to claim 21 wherein said programmable signal processor means includes a bulk memory for digital data corresponding to radar return signals, a plurality of selectively operable complex arithmetic vector signal processors coupled to said bulk memory, a scalar signal processor, a ring network bus interconnecting said plurality of complex arithmetic vector signal processors with said scalar signal processor, and a signal processor controller for controlling processing performed by said complex arithmetic vector signal processors and said scalar signal processor.

28. A synthetic aperture radar according to claim 27 wherein said bulk memory comprises a plurality of memory modules interconnected to said plurality of complex arithmetic vector signal processors via a control bus and a wired interconnects data bus, and additionally including an exciter/receiver interface input port connected to the data bus for feeding said digital data from the exciter/receiver means to said bulk memory and a display output interface port for feeding signals generated by selected ones of said complex arithmetic vector signal processors to said display means.

29. A synthetic aperture radar according to claim 28 wherein each said complex arithmetic vector signal processor includes a control module and a processor module and wherein said control module includes a source program memory and a distribution program memory, each having a plurality of storage registers coupled to said processor module via a plurality of address generators, and wherein said processor module includes means for performing addition, subtraction and multiplication on vectors of complex data fed thereto from said bulk memory and said ring network bus in response to arithmetic instructions from said source program memory and outputting the results to selected storage registers of said source program memory and said destination program memory.

30. A synthetic aperture radar according to claim 29 wherein said processor module includes a plurality of data memory registers connected between input date path switch means and output data path switch means, both controlled by address path switch and memory access control means coupled to the storage registers of said program memories.

31. A synthetic aperture radar according to claim 30 wherein said control module further includes a controlled arithmetic unit operating in response to arithmetic instructions from said source program memory and at least one general purpose storage register for storing the results outputted by said controlled arithmetic unit.

* * * * *